United States Patent
Young et al.

(10) Patent No.: US 11,668,120 B2
(45) Date of Patent: Jun. 6, 2023

(54) AUTOMATIC DOOR RELEASE WITH MECHANICAL LINKAGE

(71) Applicant: Rivian IP Holdings, LLC, Plymouth, MI (US)

(72) Inventors: Thomas Young, Royal Oak, MI (US); Rajinder Pal Singh, Plymouth, MI (US); Marcus Merideth, Westland, MI (US); Kostandinos Papanikolaou, Huntington Woods, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 270 days.

(21) Appl. No.: 16/939,550

(22) Filed: Jul. 27, 2020

(65) Prior Publication Data

US 2022/0025680 A1     Jan. 27, 2022

(51) Int. Cl.
*E05B 81/76* (2014.01)
*E05B 77/54* (2014.01)
(Continued)

(52) U.S. Cl.
CPC .............. *E05B 81/76* (2013.01); *B60R 25/01* (2013.01); *B60R 25/24* (2013.01); *B60R 25/32* (2013.01);
(Continued)

(58) Field of Classification Search
CPC ...... E05B 47/0676; E05B 81/90; E05B 77/46; E05B 81/76; E05B 13/005; E05B 81/00;
(Continued)

(56) References Cited

U.S. PATENT DOCUMENTS 4,183,177 A * 1/1980 Kurdziel ................ E05B 77/48
49/357
5,844,470 A * 12/1998 Garnault ............ G07C 9/00309
292/201
(Continued)

FOREIGN PATENT DOCUMENTS

CN       105089382 A     11/2015
CN       105089384 A     11/2015
(Continued)

OTHER PUBLICATIONS

Espacenet, English machine translation of FR 2899929 A1, generated Oct. 4, 2022 (Year: 2022).*
(Continued)

*Primary Examiner* — Kristina R Fulton
*Assistant Examiner* — Emily G. Brown
(74) *Attorney, Agent, or Firm* — Haley Guiliano LLP

(57) ABSTRACT

A system for managing door operation of a vehicle includes a door system and a doorjamb system configured for the door to close against. The door system includes a door having a handle mechanism, an indicator mechanism coupled to the handle mechanism and actuated by motion of the handle mechanism, and a latch feature configured to be engaged for latching the door closed. The doorjamb system includes a sensor configured to generate a sensor signal indicative of a state of the indicator mechanism, and a latching mechanism configured to secure and release the latch feature of the door. Control circuitry of the vehicle is coupled to the sensor and latching mechanism, and is configured to receive the sensor signal, and control the latching mechanism based on the sensor signal. The control circuitry determines state information for the vehicle and determines whether to secure or release the latch mechanism.

19 Claims, 8 Drawing Sheets

(51) Int. Cl.
*E05B 81/70* (2014.01)
*E05B 81/72* (2014.01)
*B60R 25/34* (2013.01)
*B60R 25/32* (2013.01)
*B60R 25/01* (2013.01)
*B60R 25/33* (2013.01)
*E05B 81/90* (2014.01)
*E05B 81/64* (2014.01)
*B60R 25/24* (2013.01)

(52) U.S. Cl.
CPC .............. *B60R 25/34* (2013.01); *E05B 77/54* (2013.01); *E05B 81/70* (2013.01); *E05B 81/72* (2013.01); *B60R 25/33* (2013.01); *E05B 81/64* (2013.01); *E05B 81/90* (2013.01); *E05Y 2900/531* (2013.01)

(58) Field of Classification Search
CPC ......... E05B 81/64; E05B 81/66; E05B 81/22; E05B 83/12; E05B 81/78; E05B 85/10; E05B 63/0052; Y10T 292/1047; Y10T 292/1082; Y10T 292/57
See application file for complete search history.

(56) References Cited

U.S. PATENT DOCUMENTS

| | | | | |
|---|---|---|---|---|
| 6,554,328 B2 * | 4/2003 | Cetnar | ................... | E05B 81/16 292/216 |
| 7,078,640 B2 * | 7/2006 | Miyake | ................... | H01H 21/04 200/341 |
| 7,642,669 B2 * | 1/2010 | Spurr | ................... | E05B 81/76 307/64 |
| 8,766,769 B2 * | 7/2014 | Lange | ................... | E05B 81/64 340/5.61 |
| 8,915,524 B2 * | 12/2014 | Charnesky | .............. | E05B 79/20 292/216 |
| 9,378,603 B2 * | 6/2016 | Seino | ................. | G07C 9/00309 |
| 9,580,939 B2 | 2/2017 | Fujiwara et al. | | |
| 10,227,810 B2 * | 3/2019 | Linden | ................... | B60R 13/043 |
| 10,422,166 B2 * | 9/2019 | Papanikolaou | ......... | E05B 81/04 |
| 2002/0046439 A1 * | 4/2002 | Agostini | ................ | E05B 81/76 16/110.1 |
| 2004/0070489 A1 * | 4/2004 | Ueda | ....................... | E05B 85/01 340/5.72 |
| 2005/0173937 A1 * | 8/2005 | Yoshida | ................. | E05B 81/66 296/35.1 |
| 2009/0051192 A1 * | 2/2009 | Ewing | ................... | E05C 17/006 296/146.4 |
| 2015/0115617 A1 * | 4/2015 | Powell | ................... | E05B 81/68 292/117 |
| 2016/0130843 A1 | 5/2016 | Bingle et al. | | |
| 2016/0355128 A1 * | 12/2016 | Konchan | ................ | E05B 81/72 |
| 2019/0271179 A1 | 9/2019 | Patane et al. | | |
| 2019/0376324 A1 | 12/2019 | Walawender et al. | | |

FOREIGN PATENT DOCUMENTS

| | | | | |
|---|---|---|---|---|
| CN | 106522699 A | | 3/2017 | |
| CN | 109281559 A | | 1/2019 | |
| CN | 110397357 A | | 11/2019 | |
| CN | 110570554 A | | 12/2019 | |
| CN | 110670984 A | | 1/2020 | |
| DE | 102018125419 A1 | | 4/2020 | |
| FR | 2899929 A1 | * | 10/2007 | ............. E05B 81/78 |
| FR | 2917112 A1 | * | 12/2008 | ......... E05B 63/0052 |
| GB | 2529372 A | * | 2/2016 | ......... E05B 47/0046 |
| WO | WO-2020052709 A1 | * | 3/2020 | ............. A47L 9/009 |

OTHER PUBLICATIONS

Espacenet, English machine translation of WO 2020/052709 A1, generated Jun. 13, 2022 (Year: 2022).*
Espacenet, machine translation of FR 2899929 A1, generated Oct. 4, 2022 (Year: 2022).*
Espacenet, machine translation of FR 2917112 A1, generated Jun. 16, 2022 (Year: 2022).*
Espacenet, machine translation of WO 2020/052709 A1, generated Jun. 13, 2022 (Year: 2022).*

* cited by examiner

AUTOMATIC DOOR RELEASE WITH MECHANICAL LINKAGE

The present disclosure is directed towards systems for managing a door release, and more particularly, towards systems for securing and releasing a vehicle door based on sensing a mechanical indication.

SUMMARY

The present disclosure is directed to systems for managing door operation of a vehicle. The system includes a door, a doorjamb configured for the door to close against, and control circuitry. The door includes a handle mechanism configured for mechanical activation, an indicator mechanism coupled to the handle mechanism and actuated by motion of the handle mechanism, and a latch feature. The indicator mechanism is configured to indicate a first state when the handle mechanism is not actuated and a second state when the handle mechanism is actuated. The latch feature is configured to be engaged for latching the door closed. The doorjamb includes a sensor configured to generate a sensor signal indicative of a state of the indicator mechanism, and a latching mechanism configured to secure and release the latch feature of the door. The control circuitry is coupled to the sensor and the latching mechanism, and is configured to receive the sensor signal from the sensor and control the latching mechanism based on the sensor signal. In some embodiments, the doorjamb includes a mechanical release configured to release the latching mechanism based on the motion of the handle mechanism.

In some embodiments, the handle mechanism and the indicator mechanism are mechanically actuated. In some embodiments, the handle mechanism and the indicator mechanism are not actuated by electrically powered components. In some embodiments, the handle mechanism, the indicator mechanism, and the latch feature of the door are mechanical components not containing electrical components. For example, in some embodiments, the door need not include wires, switches, cables, or other electrical components.

In some embodiments, the indicator mechanism includes a plunger coupled to the handle mechanism, the sensor includes a button configured to be pressed by the plunger when in the second state, and when the button is pressed the sensor signal is indicative of the plunger being in the second state.

In some embodiments, the control circuitry is configured to determine a position of the indicator mechanism based on the sensor signal, receive state information of the vehicle, and cause the latching mechanism to release the latch feature further based on the position and based on the state information.

In some embodiments, the handle mechanism is an exterior handle mechanism arranged on an exterior side of the door. In some embodiments, the door includes two handles: an interior and an exterior handle. The first handle mechanism, the first indicator mechanism, the first sensor (configured to generate a first sensor signal) may correspond to the vehicle exterior. In some such embodiments, the door also includes a second handle mechanism arranged on an interior side of the door, a second indicator mechanism coupled to the second handle mechanism and actuated by motion of the second handle mechanism. The second indicator mechanism is configured to indicate a third state when the second handle mechanism is not actuated and a fourth state when the second handle mechanism is actuated. The doorjamb includes a second sensor configured to generate a second sensor signal indicative of a state of the second indicator mechanism. In some embodiments, the control circuitry is configured to determine a first position of the first indicator mechanism based on the first sensor signal, determine a second position of the second indicator mechanism based on the second sensor signal, receive state information of the vehicle, and cause the latching mechanism to release the latch feature based on the state information and based on at least one of the first position or the second position.

In some embodiments, the present disclosure is directed to systems for managing door operation of a vehicle that include a door system, a doorjamb system, and control circuitry. The door system includes a door handle mechanism configured to achieve a first position and a second position. The doorjamb system is configured to generate a sensor signal indicative of the first position and the second position. The doorjamb system includes a latch system arranged in the doorjamb. The latch system includes a latch configured to secure and release the door system from the doorjamb system. The doorjamb system also includes a mechanical release configured to mechanically couple and decouple the handle mechanism from the latch system. The control circuitry is coupled to the doorjamb system, and is configured to receive the sensor signal, engage and disengage the mechanical release, and cause the latch to be secured or released based at least in part on the sensor signal.

In some embodiments, the doorjamb system is configured to receive a mechanical indication from the door handle mechanism to secure or release the door system. In some such embodiments, the control circuitry is configured to, when in a first operating mode, cause the latch system and the mechanical indication to be decoupled by disengaging the mechanical release; and when in a second operating mode, cause the mechanical indication to the latch system to be coupled by engaging the mechanical release such that the mechanical indication causes the latch to be released.

In some embodiments, the control circuitry is configured to cause the latch to be secured or released based on at least one of a proximity between a keyfob and a proximity sensor coupled to the control circuitry, a lock command from the keyfob, a status of the keyfob, a lock status of the doorjamb system, a lock status from another doorjamb system configured to interact with another door system, a lock status of a key-lock cylinder, a drivetrain status of the vehicle, a location of the vehicle, a speed of the vehicle, an electrical status of the vehicle, any other suitable state information, or any combination thereof.

In some embodiments, the present disclosure is directed to a method for managing door operation of a vehicle. The method includes generating (at a sensor system of a doorjamb) an electronic indication of a handle actuation by a user corresponding to a door of the vehicle. A mechanical indication from a door handle system triggers the electronic indication. The method also includes receiving (at control circuitry) the electronic indication of the handle actuation. The method also includes retrieving state information for the vehicle. The method also includes determining (using the control circuitry) a response to the electronic indication based on the state information of the vehicle. The method also includes causing the latch mechanism to release a latch feature of the door when the response is to release the door.

In some embodiments, the method includes determining the response based on keyfob information when the door handle is an exterior door handle, and determining the response is to release the door when the door handle in an interior door handle.

In some embodiments, the method includes retrieving state information including at least one of a proximity between a keyfob and a proximity sensor coupled to the control circuitry, a lock command from the keyfob, a status of the keyfob, a lock status of the doorjamb system, a lock status from another doorjamb system configured to interact with another door system, an ajar status of the doorjamb system, a lock status of a key-lock cylinder, a drivetrain status of the vehicle, a location of the vehicle, a speed of the vehicle, an electrical status of the vehicle, any other suitable state information, or any combination thereof.

In some embodiments, the electronic indication corresponds to an exterior handle of the door handle system and the state information includes a proximity of a keyfob to a proximity sensor of the vehicle, a lock status of a key cylinder, and an electrical status of the vehicle. The response to the electronic indication is to release the latch mechanism when the proximity is less than a threshold, the lock status of the key cylinder is unlocked, and the electrical status of the vehicle is active.

In some embodiments, the electronic indication corresponds to an exterior handle of the door handle system, and the state information includes a proximity of a keyfob to a proximity sensor of the vehicle, and a lock status of a key cylinder. The response to the indication is to secure or not release the latch mechanism when the proximity is greater than a threshold or the lock status of the key cylinder is locked.

In some embodiments, the electronic indication corresponds to an interior handle of the door handle system, and the state information comprises a lock status of a key cylinder, and an electrical status of the vehicle. The response to the indication is to release the latch mechanism when the lock status of the key cylinder is unlocked, and the electrical status of the vehicle is active.

In some embodiments, the state information includes an electrical status of the vehicle. In some such embodiments, the method includes engaging, if the electrical status of the vehicle is disrupted, a mechanical release coupling the mechanical indication to the latch mechanism such that the mechanical indication causes to the latch mechanism to release the latch feature.

In some embodiments, receiving the electronic indication of the handle actuation by the user includes detecting the mechanical indication at a sensor coupled to the control circuitry, receiving a sensor signal from the sensor at the control circuitry, and identifying the sensor signal is being indicative of the handle actuation.

In some embodiments, the state information includes respective ajar statuses for a plurality of doors of the vehicle and lock statuses for the plurality of doors. In some such embodiments, the method includes determining whether one or more doors of the plurality of doors is ajar or unlocked. The response to the indication is to secure or not release the latch mechanism when one or more doors of the plurality of doors is ajar or unlocked.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

The present disclosure is directed to systems that manage information that a door handle of a vehicle has been actuated. For example, for a purely mechanical system, when a handle is pulled, a cable may translate and eventually move a lever on a latch, thus releasing a door. In some embodiments, the systems of the present disclosure include a switch or sensor that, when pressed or activated, allow control circuitry to cause an actuator to release the latch. The system may allow a physical connection from the door handle to the latch, which may be engaged under suitable conditions. For example, it may be desired to include a door not having wires or electronics due to fatigue problems in the wire at high cycle counts. Because a power lock may be used, the system may include wiring and electronics coupled to the latch mechanism in the doorjamb (e.g., the latch actuator is body-mounted to eliminate or mitigate fatigue issues), with a latch striker arranged in the door. In some embodiments, the system receives an indication that a handle has been actuated by translating an indicator mounted on the door to engage a receiver (e.g., a switch or sensor) on the vehicle body (e.g., in the doorjamb), which is configured to generate a signal that is transmitted to the control circuitry of the system. Accordingly, the system may avoid the inclusion of wiring and electronics in the door that are bent or cycled every time the door is opened and closed. In some embodiments, the inclusion of both an automatic and a manual release-train for a vehicle door eliminates or mitigates a key failure mode for a sliding door (e.g., fatigue of a latch) while still allowing for the handle on the door to communicate information to the latch on the body via mechanical translation of the indicator.

In some embodiments, the present disclosure is directed to a system that exhibits longevity (e.g., an automatic release with virtual lock state), and having a backup, redundant system (e.g., a mechanical release that actuates the latch mechanism). For example, in the event of a failure of the automatic release train, the system's backup system may allow the vehicle to be used, thus reducing downtime. To illustrate, in the context of a delivery vehicle, security and durability may be important design considerations. If during deliver, the automatic door latch mechanism fails, the door may become inoperable from the control circuitry. The use of a system having both an automatic latching system, and a mechanical backup, unneeded latch actuations are avoided and a backup is included in the event of an electronic system failure.

Figure 1:
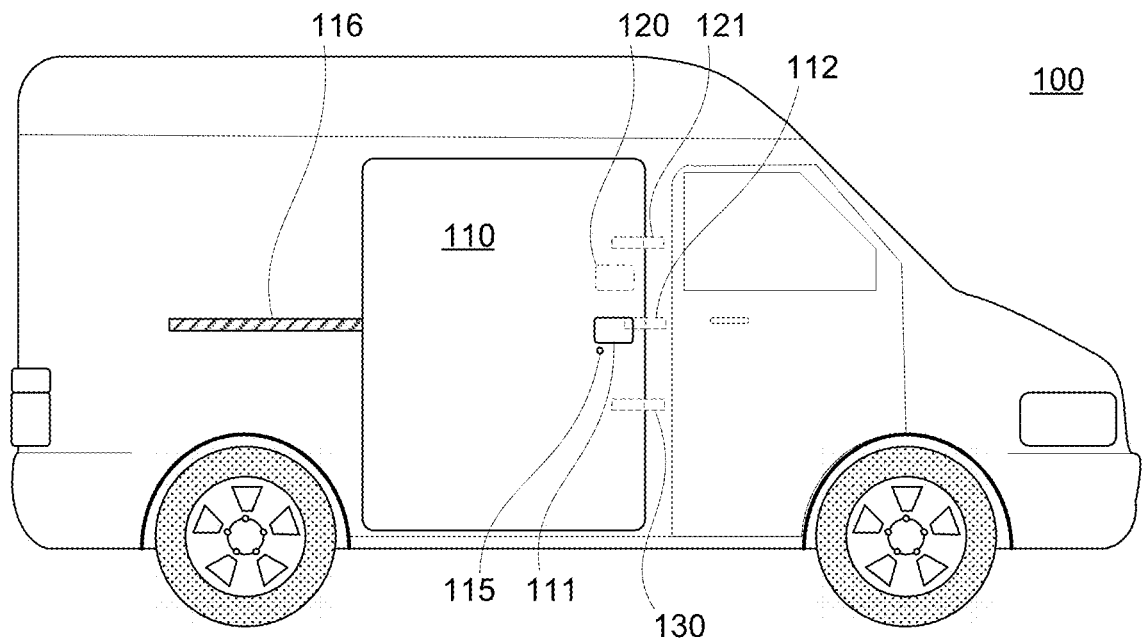
FIG. 1 shows a side view of an illustrative vehicle having a door management system, with the door closed, in accordance with some embodiments of the present disclosure.
Figure 2:
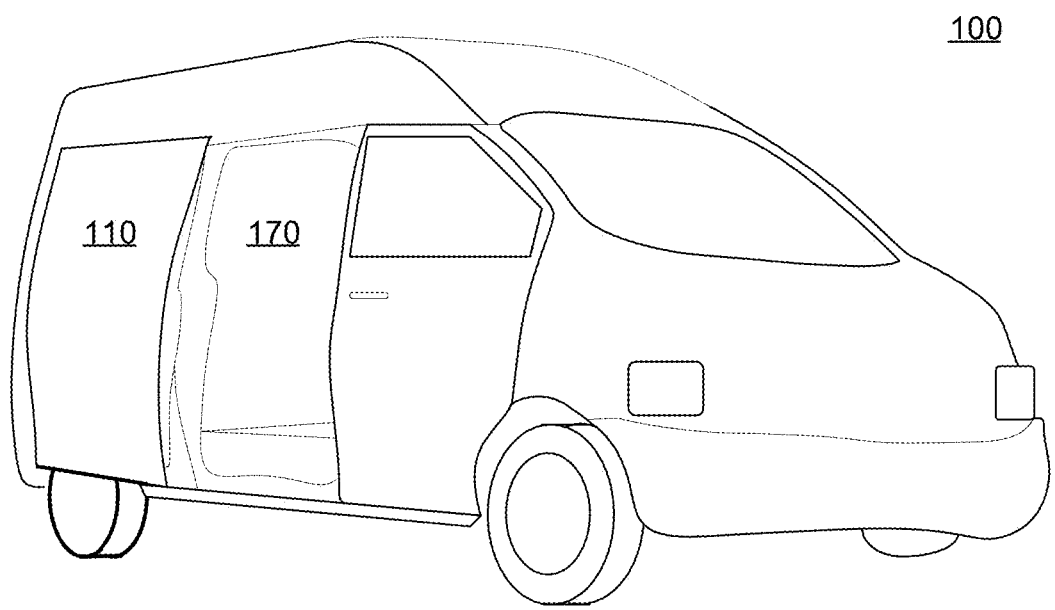
FIG. 2 shows a perspective view of the illustrative vehicle of FIG. 1, with the door open, in accordance with some embodiments of the present disclosure.

FIG. 1 shows a side view of illustrative vehicle 100 having a door management system, with door 110 closed, in accordance with some embodiments of the present disclosure. FIG. 2 shows a perspective view of illustrative vehicle 100 of FIG. 1, with door 110 open, in accordance with some embodiments of the present disclosure. As illustrated, door 110 is configured to slide open and closed, using rail 116 (and/or other rails or guides). Door 110 includes two handles, exterior handle 111 and interior handle 120, either of which may be actuated by a user to indicate the user wants to open or close the door.

Exterior handle 111, arranged on the outside of door 110 is configured to be pulled by a user to provide an indication to open door 110. Actuation of exterior handle 111 provides a mechanical indication to assembly 112, which is configured to sense the mechanical indication and generate an electrical signal that may indicate to an onboard processor of vehicle 100 of the actuation of exterior handle 111. Accordingly, exterior handle 111 and latch system 130 may be mechanically decoupled, thus allowing the onboard processor to determine whether to release a latch of latch system 130 in response to the handle pull. In some embodiments, key-lock cylinder 115 is illustrated as being arranged in door 110 to allow for a key position to set a lock/unlock state. The key-lock cylinder may be used as a mechanical interlink. In some embodiments, key-lock cylinder 115 may be arranged as part of vehicle 100 and not in door 110. In some embodiments, a keyfob may be used to control a lock status, instead of, or in addition to, key-lock cylinder 115.

Interior handle 120, arranged on the inside of door 110 is configured to be pulled by a user to provide an indication to open door 110. Interior handle 120 may be arranged in interior 170 of vehicle 100. Actuation of interior handle 120 provides a mechanical indication to assembly 121, which is configured to sense the mechanical indication and generate an electrical signal that may indicate to an onboard processor of vehicle 100 of the actuation of interior handle 120. Accordingly, interior handle 120 and latch system 130 may be mechanically decoupled, thus allowing the onboard processor to determine whether to release a latch of latch system 130 in response to the handle pull. In some embodiments, assembly 112, assembly 121, or both may be configured to transmit the mechanical indication of a respective handle pull to latch system 130, such that the user actuation causes a latch of latch system 130 to be released. For example, assembly 112, assembly 121, or both may be controlled by the onboard processor to couple or decouple the mechanical indication from latch system 130, thus allowing for manual opening, automatic opening, or both.

Figure 3:
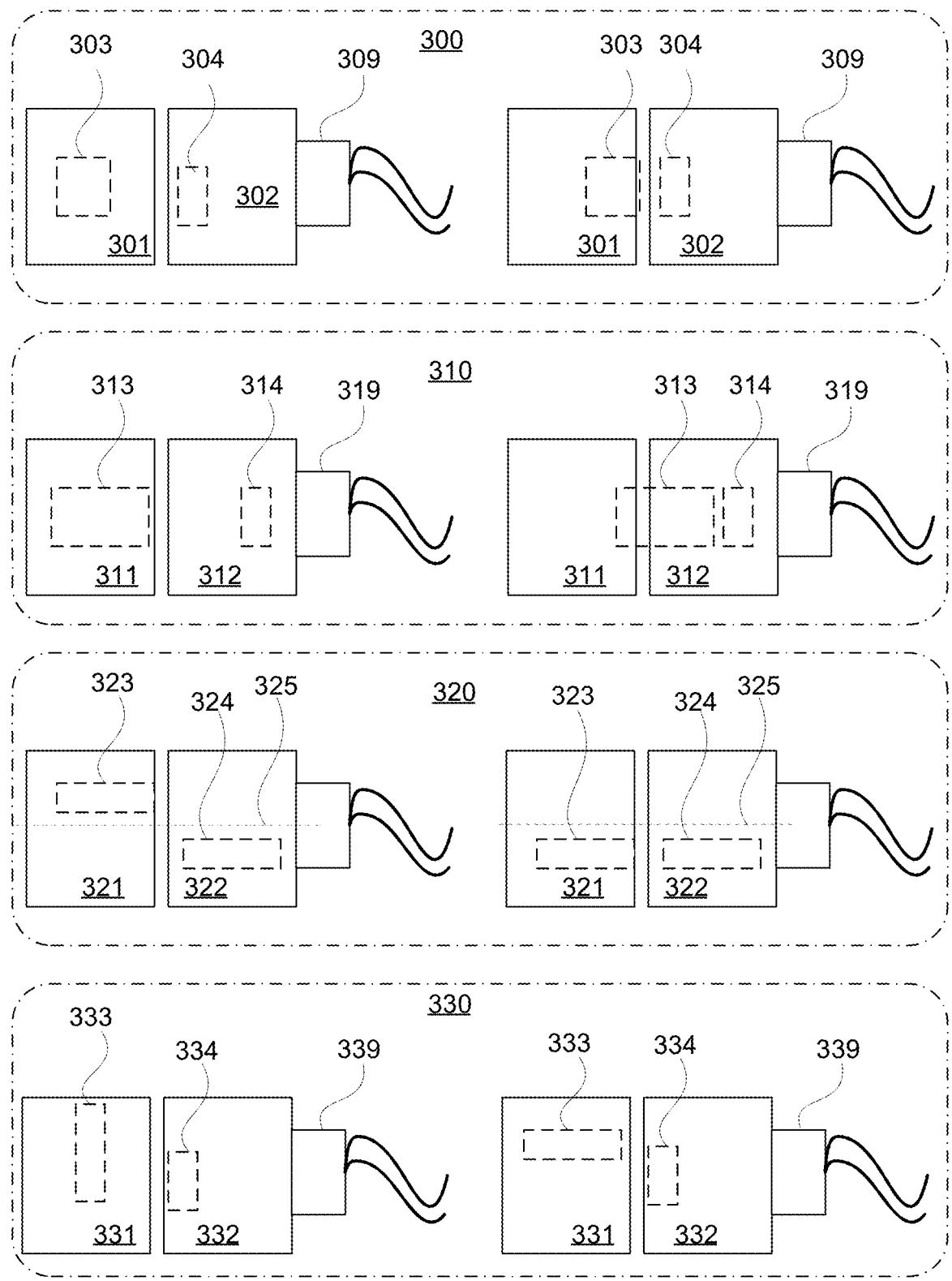
FIG. 3 shows several illustrative mechanisms for providing an indication of a door handle actuation, in accordance with some embodiments of the present disclosure.

FIG. 3 shows several illustrative mechanisms for providing an indication of a door handle actuation, in accordance with some embodiments of the present disclosure. Panel 300 shows an illustrative translating indicator, panel 310 shows another illustrative translating indicator, panel 320 shows an illustrative rotating indicator, and panel 330 shows another illustrative rotating indicator. The door systems of FIG. 3 need not include electrical components and may, for example, include mechanisms that provide a mechanical indication of a handle actuation, which may be detected by the corresponding doorjamb system.

Door system 301 of panel 300 includes indicator 303, which is coupled to a handle mechanism. When the handle mechanism is actuated, indicator 303 moves (e.g., translates, as illustrated) towards sensor 304 of doorjamb system 302. Sensor 304 generates a sensor signal from interface 309, which may be received by control circuitry. As illustrated, on the left hand side, indicator 303 is arranged indicative of no handle actuation, and on the right hand side, indicator 303 is arranged indicative of a handle actuation. As illustrated, indicator 303, which is a plunger, does not extend into doorjamb system 302. For example, sensor 304 may include a Hall effect sensor, an optical or acoustic proximity sensor, an image based sensor, an electrical switch that undergoes a change in throw position as indicator 303 moves, an electrical contact, any other suitable sensor or switch, or any combination thereof. In an illustrative example, sensor 304 may include a push-button type switch that, when pushed by indicator 303, completes or interrupts an electrical circuit to provide an electrical indication to control circuitry.

Door system 311 of panel 310 includes indicator 313, which is coupled to a handle mechanism. When the handle mechanism is actuated, indicator 313 moves (e.g., translates, as illustrated) towards sensor 314 of doorjamb system 312. Sensor 314 generates a sensor signal from interface 319, which may be received by control circuitry. As illustrated, on the left hand side, indicator 313 is arranged indicative of no handle actuation, and on the right hand side, indicator 313 is arranged indicative of a handle actuation. As illustrated, indicator 313, which is a plunger, is configured to extend into doorjamb system 312. For example, sensor 314 may include a Hall effect sensor, an optical or acoustic proximity sensor, an image based sensor, an electrical switch that undergoes a change in throw position as indicator 313 moves, an electrical contact, any other suitable sensor or switch, or any combination thereof. In an illustrative example, sensor 314 may include a push-button type switch that, when pushed by indicator 313 (e.g., which may include a plunger), completes or interrupts an electrical circuit to provide an electrical indication to control circuitry.

Door system 321 of panel 320 includes indicator 323, which is coupled to a handle mechanism. When the handle mechanism is actuated, indicator 323 rotates about axis 325 to align with sensor 324 (e.g., an image-based or line-of-sight detector as illustrated) of doorjamb system 322. Sensor 324 generates a sensor signal from interface 329, which may be received by control circuitry. As illustrated, on the left hand side, indicator 323 is arranged indicative of no handle actuation, and on the right hand side, indicator 323 is arranged indicative of a handle actuation. As illustrated, indicator 323, which is rotation-based indicator, does not extend into doorjamb system 322, but rather is detectable by sensor 324. In some embodiments, indicator 323 and sensor 324 may include a rotary switch configured to output a signal based on the position of indicator 323. For example, sensor 324 may include a Hall effect sensor, an optical or acoustic proximity sensor, an image based sensor, an electrical switch that undergoes a change in throw position as indicator 323 moves, an electrical contact, any other suitable sensor or switch, or any combination thereof. In an illustrative example, sensor 324 may include a Hall effect sensor that, when indicator 323 is in proximity, provides an electrical indication to control circuitry.

Door system 331 of panel 330 includes indicator 333, which is coupled to a handle mechanism. When the handle mechanism is actuated, indicator 333 rotates to an arrangement more proximal to sensor 334 (e.g., a Hall-effect sensor, proximity sensor, or any other suitable sensor) of doorjamb system 332. Sensor 334 generates a sensor signal from interface 339, which may be received by control circuitry. As illustrated, on the left hand side, indicator 333 is arranged indicative of no handle actuation, and on the right hand side, indicator 333 is arranged indicative of a handle actuation. As illustrated, indicator 333, which is rotation-based indicator, does not extend into doorjamb system 332, but rather is detectable by sensor 334. In some embodiments, indicator 333 and sensor 334 may include a rotary switch configured to output a signal based on the position of indicator 333. For example, sensor 334 may include a Hall effect sensor, an optical or acoustic proximity sensor, an image based sensor, an electrical switch that undergoes a change in throw position as indicator 333 moves, an electrical contact, any other suitable sensor or switch, or any combination thereof. In an illustrative example, sensor 334 may include a Hall effect sensor that, when indicator 333 is in proximity, provides an electrical indication to control circuitry.

To illustrate, any suitable phenomena may be used to transmit an indication of a handle actuation. For example, an indicator and sensor may include a magnet and hall effect sensor, an adjustable geometry having a capacitance (e.g., two parallel plates moving relative to each other may be used to sense a change in capacitance), an optical sensor and pin that blocks/permits light to the sensor, an image based sensor that detects the indicator, any other suitable sensor/indicator combination to convert a mechanical indication into an electrical signal, or any combination thereof.

Figure 4:
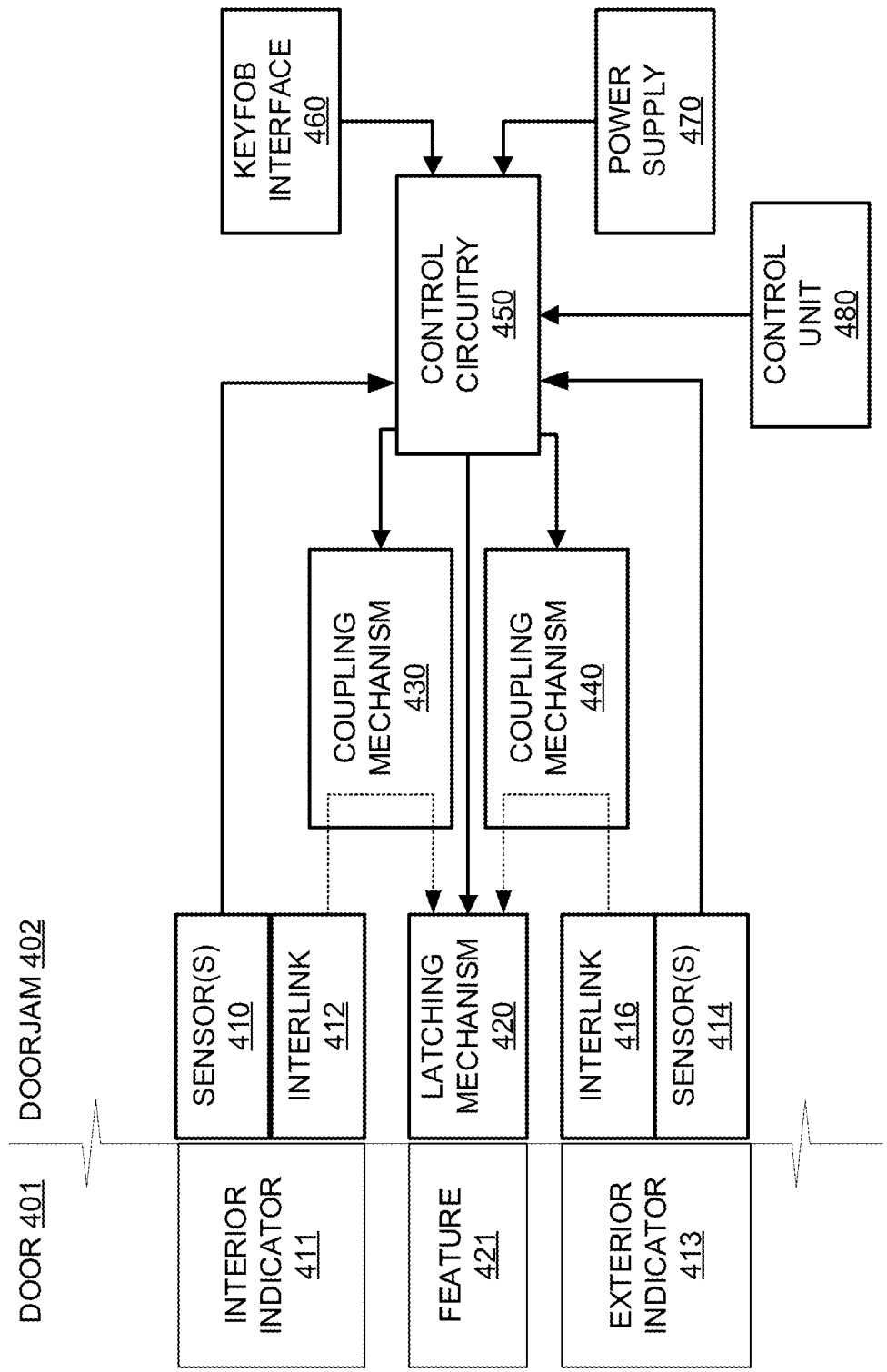
FIG. 4 shows a block diagram of an illustrative system for managing a vehicle door, in accordance with some embodiments of the present disclosure.

FIG. 4 shows a block diagram of illustrative system 400 for managing a vehicle door, in accordance with some embodiments of the present disclosure. As illustrated, vehicle 400 includes doorjamb system 402 that includes one or more sensors 410, one or more sensors 414, interlink 412, interlink 416, latching mechanism 420, coupling mechanism 430, coupling 440, control circuitry 450, keyfob interface 460, power supply 470, and control unit 480. System 402 is arranged, for example, in vehicle 400 at least partially at a doorjamb configured to interface to door 401. As illustrated, door 401 includes interior indicator 411, exterior indicator 413, and latch feature 421. Door 401, as illustrated, does not include electronic components for securing or releasing the door (e.g., and need not include any electronic components).

In an illustrative example, door 401 may include a sliding door (e.g., of a van or delivery vehicle), a hinged door (e.g., of a passenger car or truck), a tailgate (e.g., of a cargo bed of a truck), a pocket door (e.g., of a delivery vehicle), a hatch door (e.g., of a sports utility vehicle), a trunk, any other suitable door or gate, or any combination thereof. For example, a vehicle may include a doorjamb system at one or more doors or gates, and the doorjamb systems may operate together (e.g., controlled by common control circuitry or separate control circuitry in communication with one another). Doorjamb system 402 is configured to secure or release door 401 based on inputs, state information, and logic/computing operation. To illustrate, doorjamb system 402 allows the mechanical actuation of a handle of door 401 to be coupled or decoupled from latching mechanism 420. To further illustrate, doorjamb system 402 allows inputs to be analyzed and a determination to be made as to whether to unlatch door 401 (e.g., via latching mechanism 420), rather than necessarily securing or latching door 401 in response to any particular input or indication. In some circumstances, doorjamb system 402 prevents unnecessary or superfluous latching/unlatching of door 401, thus improving reliability.

Interior indicator 411 is configured to provide a mechanical indication to system 400 that an interior door handle has been actuated. For example, when a user actuates an interior door handle, interior indicator 411 provides a mechanical indication to one or more sensors 410, interlink 412, or both. To illustrate, interior indicator 411 may include a cable mechanism connected to the interior door handle that, when pulled by the handle, causes a mechanical indication to occur at one or more sensors 410, interlink 412, or both. The mechanical indication may include, for example, extension of a pin, retraction of a pin, rotation of a cam, any other suitable mechanical indication, or any combination thereof.

Exterior indicator 413 is configured to provide a mechanical indication to system 400 that an exterior door handle has been actuated. For example, when a user actuates an exterior door handle, exterior indicator 413 provides a mechanical indication to one or more sensors 414, interlink 416, or both. To illustrate, interior indicator 413 may include a cable mechanism connected to the interior door handle that, when pulled by the handle, causes a mechanical indication to occur at one or more sensors 414, interlink 416, or both. The mechanical indication may include, for example, extension of a pin, retraction of a pin, rotation of a cam, any other suitable mechanical indication, or any combination thereof.

Latch feature 421 is configured to be engaged with, and disengaged from, latching mechanism 420. For example, latch feature 421 may include a striker, a pin, a loop, a recess, any other suitable feature with which a latch may engage, or any combination thereof.

One or more sensors 410 are configured to detect a mechanical indication from interior indicator 411. One or more sensors 410 are communicatively coupled to control circuitry 450. For example, control circuitry 450 may be configured to receive sensor signals from one or more sensors 410, provide a carrier signal or other reference signal to one or more sensors 410, provide electric power to one or more sensors 410, perform any other suitable operation to receive sensor signals from one or more sensors 410, or any combination thereof. One or more sensors 410 may include for example, optical sensors (e.g., using any suitable wavelength of electromagnetic radiation such as visible or infrared), image-based sensors, electronic sensors, electromagnetic sensors, any other suitable sensor, or any combination thereof. For example, one or more sensors 410 may include a single Hall effect sensor configured to detect a metal pin or other member of interior indicator 411. In some embodiments, one or more sensors 410 are integrated with control circuitry 450. For example, control circuitry 450 may include a fiber optic system, and one or more sensors 410 may include optical fibers for detecting a line of sight blockage (e.g., from a pin of interior indicator 411).

Interlink 412 is a mechanism that is configured to receive the mechanical indication from interior indicator 411 and provide a second mechanical indication to latching mechanism 420. For example, interior indicator 411 may include a pin that extends into interlink 412 and actuates a mechanism that in turn applies tension to a cable that releases latching mechanism 420. Coupling mechanism 430 is configured to allow, or disallow, the mechanical indication from interior indicator 411 from being transmitted by interlink 412 to latching mechanism 420. For example, coupling mechanism 430 may be configured to affect the slack in a cable, or engagement of a linkage, thus either allowing or disallowing tension in the cable, or force in the linkage, to be transmitted to latching mechanism 420. Coupling mechanism 430 is communicatively coupled to control circuitry 450, which is configured to cause coupling mechanism 430 to allow or disallow transmission of the mechanical indication from interior indicator 411. For example, coupling mechanism 430 may include an electromechanical actuator controlled by a control signal from control circuitry 450 (e.g., which may provide electrical signals, electrical power, or both to coupling mechanism 430). Coupling mechanism 430 may include a clamp mechanism (e.g., using friction force to transmit the mechanical indication, cam mechanism (e.g., to impart or relax tension in a cable), a cinch mechanism (e.g., to take up slacking in a cable), a linkage (e.g., to adjust kinematics of the mechanism indication), any other suitable mechanism, or any combination thereof. In some embodiments, control circuitry 450, when powered or otherwise active, may prevent coupling mechanism 430 from transmitting mechanical forces indications from interlink 412 to latching mechanism 420. For example, control circuitry 450 may provide electrical power to an actuator that prevent mechanical interlinking of interlink 412 and latching mechanism 420, thus causing actuation of latching mechanism by control circuitry 450 and not a handle pull (e.g., the determination to latch is gated by control circuitry 450 in all instances). When power is lost, unavailable, or when control circuitry 450 otherwise does not or cannot prevent the mechanical interlinking, coupling mechanism 430 may mechanically couple interlink 412 to latching mechanism 420 (e.g., such that a handle pull causes a force to be applied to latching mechanism 420 to cause release). Any combination of mechanism, spring, clamps, or other components or combinations thereof may be used to prevent and allow the mechanical interlinking between interlink 412 and latching mechanism 420.

One or more sensors 414 are configured to detect a mechanical indication from exterior indicator 413. One or more sensors 414 are communicatively coupled to control circuitry 450. For example, control circuitry 450 may be configured to receive sensor signals from one or more sensors 414, provide a carrier signal or other reference signal to one or more sensors 414, provide electric power to one or more sensors 414, perform any other suitable operation to receive sensor signals from one or more sensors 414, or any combination thereof. One or more sensors 414 may include for example, optical sensors (e.g., using any suitable wavelength of electromagnetic radiation such as visible or infrared), image-based sensors, electronic sensors, electromagnetic sensors, any other suitable sensor, or any combination thereof. For example, one or more sensors 414 may include a single Hall effect sensor configured to detect a metal pin or other member of exterior indicator 413. In some embodiments, one or more sensors 414 are integrated with control circuitry 450. For example, control circuitry 450 may include a fiber optic system, and one or more sensors 414 may include optical fibers for detecting a line of sight blockage (e.g., from a pin of exterior indicator 413). One or more sensors 414 may be the same as, or different from, one or more sensors 410.

Interlink 416 is a mechanism that is configured to receive the mechanical indication from exterior indicator 413 and provide a second mechanical indication to latching mechanism 420. For example, exterior indicator 413 may include a pin that extends into interlink 416 and actuates a mechanism that in turn applies tension to a cable that releases latching mechanism 420. Coupling mechanism 440 is configured to allow, or disallow, the mechanical indication from exterior indicator 413 from being transmitted by interlink 416 to latching mechanism 420. For example, coupling mechanism 430 may be configured to affect the slack in a cable, or engagement of a linkage, thus either allowing or disallowing tension in the cable, or force in the linkage, to be transmitted to latching mechanism 420. Coupling mechanism 440 is communicatively coupled to control circuitry 450, which is configured to cause coupling mechanism 440 to allow or disallow transmission of the mechanical indication from exterior indicator 413. For example, coupling mechanism 440 may include an electromechanical actuator controlled by a control signal from control circuitry 450 (e.g., which may provide electrical signals, electrical power, or both to coupling mechanism 440). Coupling mechanism 440 may include a clamp mechanism (e.g., using friction force to transmit the mechanical indication, cam mechanism (e.g., to impart or relax tension in a cable), a cinch mechanism (e.g., to take up slacking in a cable), a linkage (e.g., to adjust kinematics of the mechanism indication), any other suitable mechanism, or any combination thereof. Interlink 416 may be the same as, different from, or integrated with interlink 412. Coupling mechanism 440 may be same as, different from, or integrated with coupling mechanism 430. In some embodiments, control circuitry 450, when powered or otherwise active, may prevent coupling mechanism 440 from transmitting mechanical forces indications from interlink 416 to latching mechanism 420. For example, control circuitry 450 may provide electrical power to an actuator that prevent mechanical interlinking of interlink 416 and latching mechanism 440, thus causing actuation of latching mechanism by control circuitry 450 and not a handle pull (e.g., the determination to latch is gated by control circuitry 450 in all instances). When power is lost, unavailable, or when control circuitry 450 otherwise does not or cannot prevent the mechanical interlinking, coupling mechanism 440 may mechanically couple interlink 416 to latching mechanism 420 (e.g., such that a handle pull causes a force to be applied to latching mechanism 420 to cause release). Any combination of mechanism, spring, clamps, or other components or combinations thereof may be used to prevent and allow the mechanical interlinking between interlink 416 and latching mechanism 420.

Control circuitry 450 may include hardware, software, or both, implemented on one or more modules configured to provide control of a vehicle door. For example, control circuitry 450 may include one or more processors, memory, actuator drive units, a sensor interface, a communications interface, any other suitable components or functionality, or any combination thereof. In some embodiments, control circuitry includes a processor such as, for example, one or more microprocessors, microcontrollers, digital signal processors, programmable logic devices, field-programmable gate arrays (FPGAs), application-specific integrated circuits (ASICs), or any suitable combination thereof. In some embodiments, the processor is distributed across more than one processor or processing units. In some embodiments, control circuitry 450 executes instructions stored in memory for managing a vehicle door. In some embodiments, control circuitry 450 includes memory such as, for example, an electronic storage device configured to store electronic data, computer instructions, applications, firmware, or any other suitable information. In some embodiments, the memory includes random-access memory, read-only memory, hard drives, optical drives, solid state devices, or any other suitable memory storage devices, or any combination thereof. For example, memory may be used to launch a start-up routine.

As illustrated, control circuitry 450 is powered by power supply 470. In some embodiments, power supply 470 includes a car battery (e.g., a 12 V lead acid battery), a DC-DC converter, an AC power supply (e.g., generated by suitably inverting a DC power supply), any other power supply, any corresponding components (e.g., terminals, switches, fuses, and cables), or any combination thereof. In some embodiments, power supply 470 supplies power to latching mechanism 420, one or more sensors 410 and 414, coupling mechanisms 430 and 440, control circuitry 450, any other suitable systems or components, or any combination thereof.

In some embodiments, control circuitry 450 includes a user interface such as, for example, a push button, a toggle switch, a display screen (e.g., a touch screen), a key-lock combination, any other suitable system or component for receiving input from a user or providing output to a user, or any combination thereof. In some embodiments, the user interface includes a touchscreen on the dash of a vehicle, configured to receive input from the user, and provide a display to the user. In some embodiments, the user interface includes one or more buttons that are selectable by a user. For example, the one or more buttons may include a button coupled to a switch, a button on a touchpad, any other suitable button that may be used by a user to make a selection, or any combination thereof. In some embodiments, keyfob interface 460 is communicatively coupled to control circuitry. In some embodiments, keyfob interface 460 is integrated with control circuitry 450. For example, a keyfob may include one or more buttons, which, when pressed by a user, may provide an indication to keyfob interface 460. In some embodiments, the user interface is implemented on a smartphone, tablet, or other portable device, which may communicate with control circuitry 450 via a communications interface of control circuitry 450. For example, a software application, or "app," may be implemented on a smartphone, with user-selectable options which may be communicated to control circuitry via a 3G/4G/5G network, WiFi, Bluetooth, or any other suitable communication protocol.

Latching mechanism 420 is communicatively coupled to control circuitry 450, as illustrated. In some embodiments, latching mechanism 420 includes an actuator such as, for example, a rotary actuator (e.g., an AC motor, or a DC motor), a linear actuator (e.g., an electric solenoid, hydraulic actuator, or a pneumatic actuator), a counterweight, a rotation element (e.g., a torsion spring or damper), a cinching actuator, any other suitable actuator, or any combination thereof. In some embodiments, latching mechanism 420 includes a brake, a clutch, a transmission (e.g., geared or belt-driven), a lock, a latch, a cable system, a linkage, any other suitable hardware, or any combination thereof. In some embodiments, a plurality of latch mechanisms and/or actuators may be included to, for example, secure one or more doors of a vehicle.

Control unit 480 may include a vehicle control unit, or central processing unit (e.g., for an electrical vehicle). Control unit 480 may be configured to control one or more aspects of operation of vehicle 400, store information about vehicle 400, manage subsystems of vehicle 400, manage a communication bus of vehicle 400 (e.g., a CANbus or modbus), perform any other suitable operation, or any combination thereof. In some embodiments, control unit 480 is configured to provide state information to control circuitry 450. For example, control unit 480 may be configured to provide vehicle speed, gear position (e.g., DRIVE, PARK, NEUTRAL), vehicle location (e.g., from GPS or network based location sensing), keyfob information (e.g., position, proximity and/or state), electronic status information (e.g., powered/unpowered, failure or fault, charging status, state of charge), lock status of vehicle 400, any other suitable information about vehicle 400, or any combination thereof. In some embodiments, control circuitry 450 and control unit 480 may be integrated with each other, and need not be separate components.

In an illustrative example, control unit 480 may provide state information to control circuitry 450. When control circuitry 450 identifies a handle actuation based on either sensor(s) 410 or 414, control circuitry 450 may determine whether to cause latching mechanism 420 to release latch feature 421. For example, if control unit 480 indicates vehicle 400 is stopped (e.g., not moving and/or in PARK), and control circuitry 450 identifies that the vehicle is unlocked (e.g., via keyfob interface 460 or control unit 480), then control circuitry 450 may cause latching mechanism 420 to disengage latch feature 421 such that door 401 may be opened.

In a further illustrative example, control unit 480 may provide state information to control circuitry 450. When control circuitry 450 identifies a handle actuation based on either sensor(s) 410 or 414, control circuitry 450 may determine whether cause latching mechanism 420 to release latch feature 421. For example, if control unit 480 indicates vehicle 400 is unpowered or is otherwise exhibiting an electrical fault, then control circuitry 450 may cause either or both of coupling mechanisms 430 and 440 to engage such that the mechanical indication from either of interior indicator 411 or exterior indicator 413 is transmitted to latching mechanism 420 to disengage latch feature 421 such that door 401 may be opened.

Figure 5:
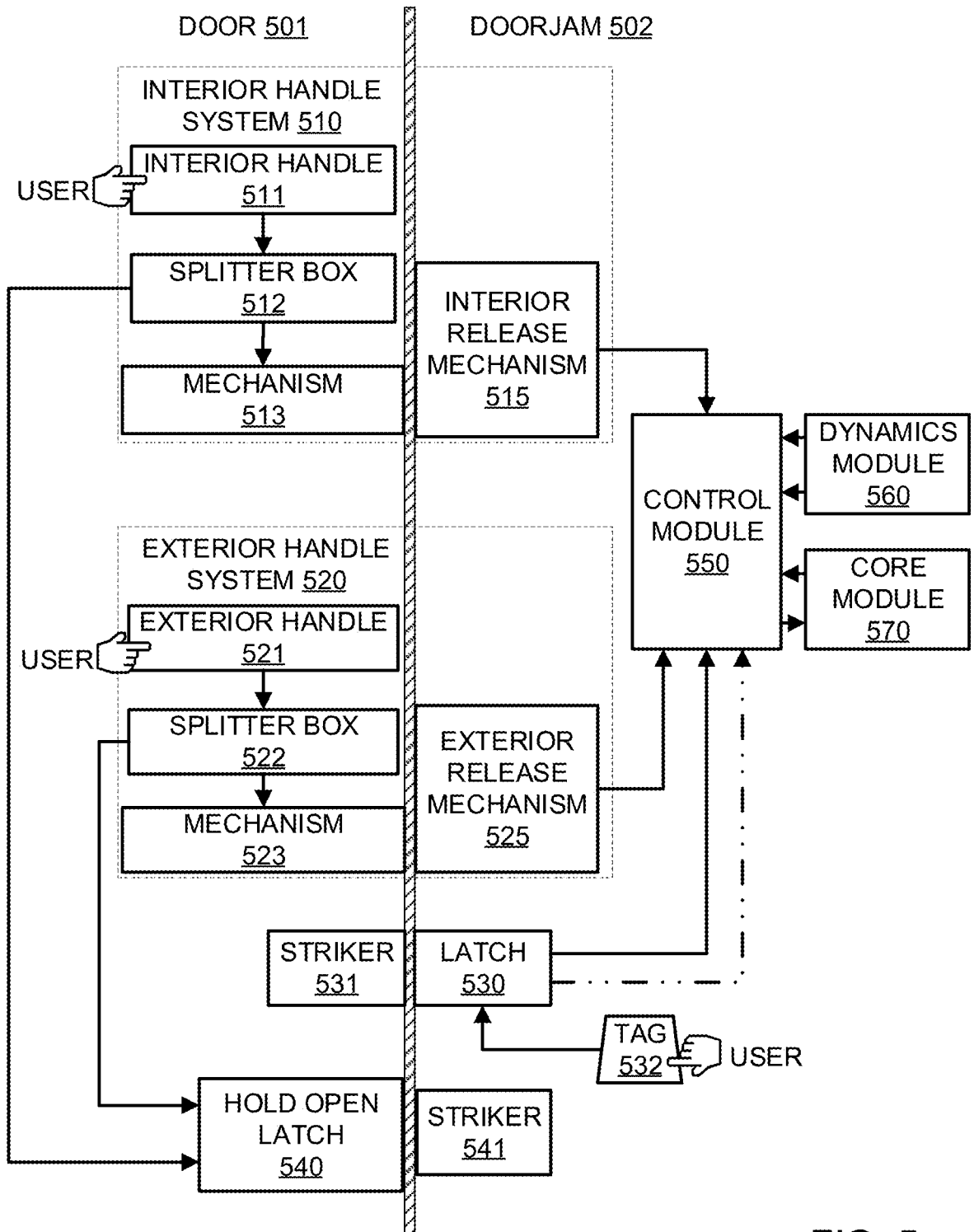
FIG. 5 shows a block diagram of another illustrative system for managing a vehicle door, in accordance with some embodiments of the present disclosure.

FIG. 5 shows a block diagram of illustrative system 500 for managing a vehicle door, in accordance with some embodiments of the present disclosure. System 500 includes door 501 and doorjamb 502 (e.g., which may include portions of a vehicle body and frame, or components arranged in the body or frame). To illustrate, system 500 may be included in a vehicle (e.g., an electric vehicle). System 500, as illustrated, includes interior handle system 510, exterior handle system 520, latch 530, striker 531, hold open latch 540, striker 541, control module 550, dynamics module 560, and core module 570. As illustrated, hold open latch 540, striker 531, a portion of interior handle system 510, and a portion of exterior handle system 520 are arranged as part of door 501. As illustrated, control module 550, dynamics module 560, core module 570, latch 530, tag 532, striker 541, a portion of interior handle system 510, and a portion of exterior handle system 520 are arranged as part of doorjamb 502. In some embodiments, system 500 may be included as part of, or otherwise combined with, systems of vehicle 400 of FIG. 4. Latch 530 and striker 531 are configured to secure and release door 501 from a closed position. Hold open latch 540 and striker 541 are configured to secure and release door 501 from an open position. For example, hold open latch 540 may be arranged on an opposite side of doorjamb 502 from latch 530 (e.g., latch 530 may be arranged at the front of doorjamb 502, and hold open latch 540 may be arranged at the rear of doorjamb 502).

Interior handle system 510 is configured to receive an actuation of interior handle 511 by a user and transmit that actuation as a mechanical indication to interior release mechanism 515 and hold open latch 540 using splitter box 512. Splitter box 512 may include a linkage or other suitable components for transferring force from the user actuation of interior handle 511 to, for example, a pair of cables coupled to mechanism 513 and hold open latch 540, respectively. For example, splitter box 512 may include a clamp that secures two cables together such that tension applied to an end of one cable is transmitted to two lengths of cable, respectively connected to mechanism 513 and hold open latch 540. Mechanism 513 is configured to receive a mechanical indication from splitter box 512 and provide a mechanical indication to interior release mechanism 515. Interior release mechanism 515 may include a sensor for sensing the mechanical indication, a mechanism for transmitting the mechanical indication, or both.

To illustrate, a user may actuate interior handle 511 to indicate that the user wants to open door 501, from the inside. Accordingly, interior handle 511 transmits a mechanical indication, caused by the user actuation, to splitter box 512, which in turn transmits a mechanical indication to mechanism 513. Mechanism 513 provides a mechanical indication to interior release mechanism 515. Interior release mechanism 515 is communicatively coupled to control module 550, and is configured to provide a signal (e.g., an electrical signal) to control module 550 indicative of the mechanical indication. Splitter box 512 allows the mechanical indication (e.g., caused by the actuation of interior handle 511) to be transmitted to hold open latch 540, which releases striker 541. For example, hold open latch 540 secures and releases striker 541 based on a user actuation of interior handle 511 based on transmission of forces via a mechanical link (e.g., a linkage, a cable system, or a combination thereof). Hold open latch 540 may be configured to engage striker 541 when door 501 is in an open position. For example, actuation of interior handle 511 may provide mechanical indication to release hold open latch 540 (e.g., via splitter box 512), provide mechanical indication that is received (and transmitted) by interior release mechanism 515 (e.g., via splitter box 512 and mechanism 513), or both.

Exterior handle system 520 is configured to receive an actuation of exterior handle 521 by a user and transmit that actuation as a mechanical indication to exterior release mechanism 525 and hold open latch 540 using splitter box 522. Splitter box 522 may include a linkage or other suitable components for transferring force from the user actuation of exterior handle 521 to, for example, a pair of cables coupled to mechanism 523 and hold open latch 540, respectively. For example, splitter box 522 may include a clamp that secures two cables together such that tension applied to an end of one cable is transmitted to two lengths of cable, respectively connected to mechanism 523 and hold open latch 540. Mechanism 523 is configured to receive a mechanical indication from splitter box 522 and provide a mechanical indication to exterior release mechanism 525. Exterior release mechanism 525 may include a sensor for sensing the mechanical indication, a mechanism for transmitting the mechanical indication, or both.

To illustrate, a user may actuate exterior handle 521 to indicate that someone wants to open door 501, from the outside. Accordingly, exterior handle 521 transmits a mechanical indication, caused by the user actuation, to splitter box 522, which in turn transmits a mechanical indication to mechanism 523. Mechanism 523 provides a mechanical indication to exterior release mechanism 525. Exterior release mechanism 525 is communicatively coupled to control module 550, and is configured to provide a signal (e.g., an electrical signal) to control module 550 indicative of the mechanical indication. Splitter box 522 allows the mechanical indication (e.g., caused by the actuation of exterior handle 521) to be transmitted to hold open latch 540, which releases striker 541. For example, hold open latch 540 secures and releases striker 541 based on a user actuation of exterior handle 521 based on transmission of forces via a mechanical link (e.g., a linkage, a cable system, or a combination thereof). For example, actuation of exterior handle 521 may provide mechanical indication to release hold open latch 540 (e.g., via splitter box 522), provide mechanical indication that is detectable by exterior release mechanism 525 (e.g., via splitter box 522 and mechanism 523), or both.

Control module 550 may include control circuitry configured to manage latching of door 501. In an illustrative example, control module 550 may be the same as, or different from, control circuitry 450 of FIG. 4. Control module 550 may be configured to, for example, receive information over a communications bus (e.g., lock status over CANbus), receive an actuation request (e.g., from interior handle system 510 or exterior handle system 520), receive latch information (e.g., ajar status, secure/release status), transmit information (e.g., latch information or latch status to core module 570), drive an actuator of latch 530, perform any other suitable function, or any combination thereof. In some embodiments, control module 550 receives inputs (e.g., sensor signals, state information, user inputs to a keyfob or interface), analyzes the inputs, determines whether to secure or release latch 530 from striker 531, and causes latch 530 to be released or secured based on that determination.

Dynamics module 560 may include control circuitry configured to provide state information to control module 550. In an illustrative example, dynamics module 550 may be included as part of control unit 480 of FIG. 4. Dynamic module 560 may provide, for example, gear state information, speed state information, location information, lock state information, driver/user information, environmental information, any other suitable information, or any combination thereof.

Core module 570 may include control circuitry configured to provide state information to control module 550 and receive information from control module 550. In an illustrative example, core module 550 may be the same as, or be included as part of, control unit 480 of FIG. 4. Core module 560 may provide, for example, gear state information, speed state information, location information, lock state information, keyfob information, any other suitable information, or any combination thereof. In some embodiments, core module 570, control module 550, or both, may include reference information, preference information, or any other suitable information for managing securement and release of door 501.

In some embodiments, doorjamb 502, or latch 530 thereof, may include an ajar sensor configured to sense whether door 501 is secured to doorjamb 502 or if door 501 is partially or fully unsecured. For example, the ajar sensor may include a Hall effect sensor, a pushbutton coupled to an electrical switch, any other suitable sensor, or any combination thereof. In some embodiments, the ajar sensor may provide a binary indication (e.g., by using an electrical switch) to control module 550.

In an illustrative example, control module 550, dynamics module 560, and core module 570 may be communicatively coupled using a communications bus such as a CANbus to receive and transmit information. In some embodiments, control module 550 may query either or both of dynamics module 560 and core module to receive information (e.g., in response to a detected handle pull). In some embodiments, dynamics module 560 and core module 570 push information to control module 550 on a predetermined frequency, when any information changes, any other schedule, or any combination thereof.

In some embodiments, as illustrated, tag 532 is arranged in the vehicle interior (e.g., as part of doorjamb 502), and may be actuated by a user to mechanically release latch 530. For example, if power is unavailable or a fault condition exists, the user may elect to release latch 530 by actuating tag 532 (e.g., pulling a cable in some embodiments, although any suitable mechanism may be used). Latch 530 may include any suitable type of latching mechanism for securing and releasing striker 531. For example, latch 530 may be the same as, different from, or represent a portion of latching mechanism 420 of FIG. 4.

Figure 6:
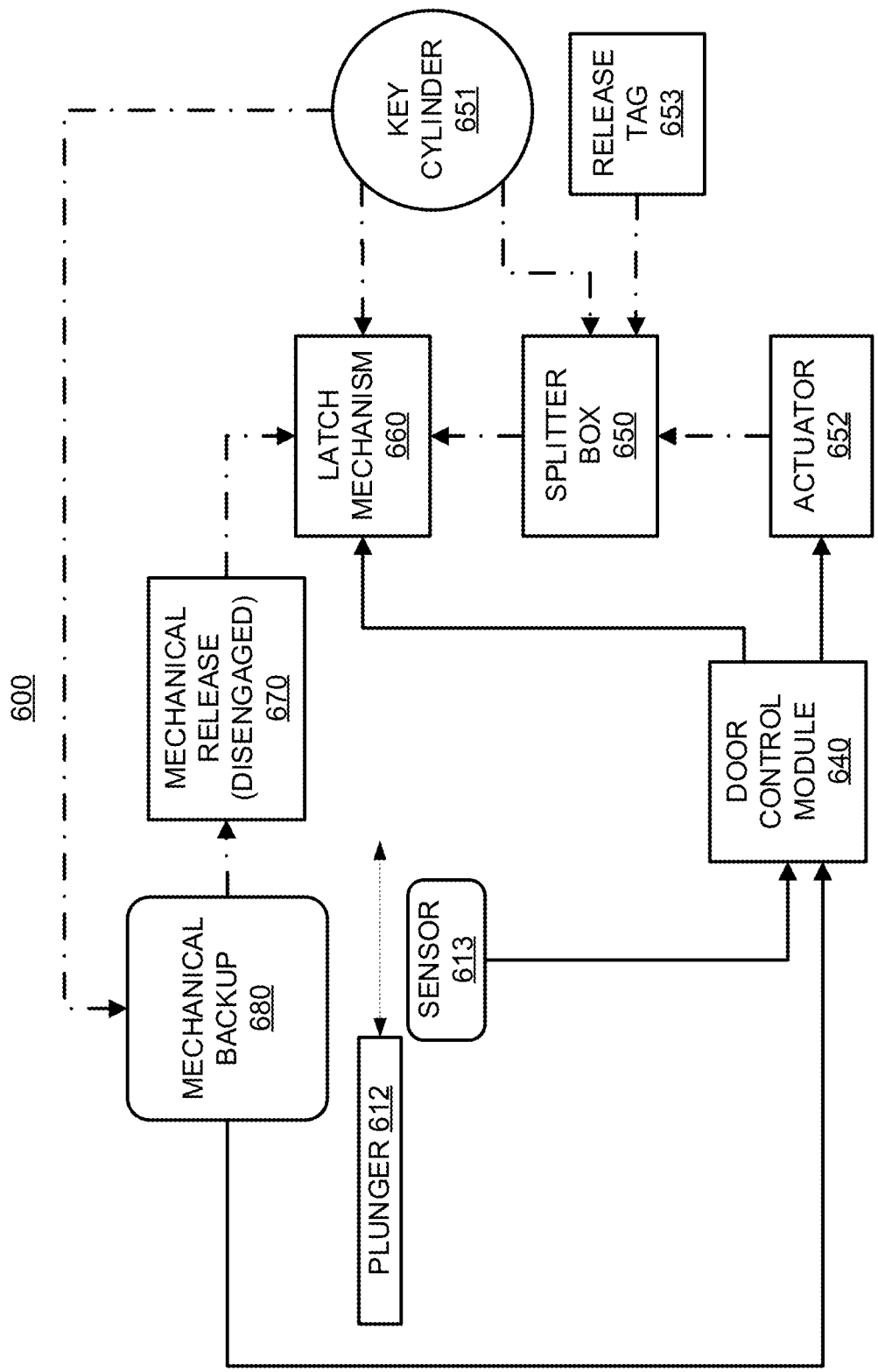
FIG. 6 shows a block diagram of an illustrative system for managing a latching mechanism of a vehicle, in a first mode, in accordance with some embodiments of the present disclosure.
Figure 7:
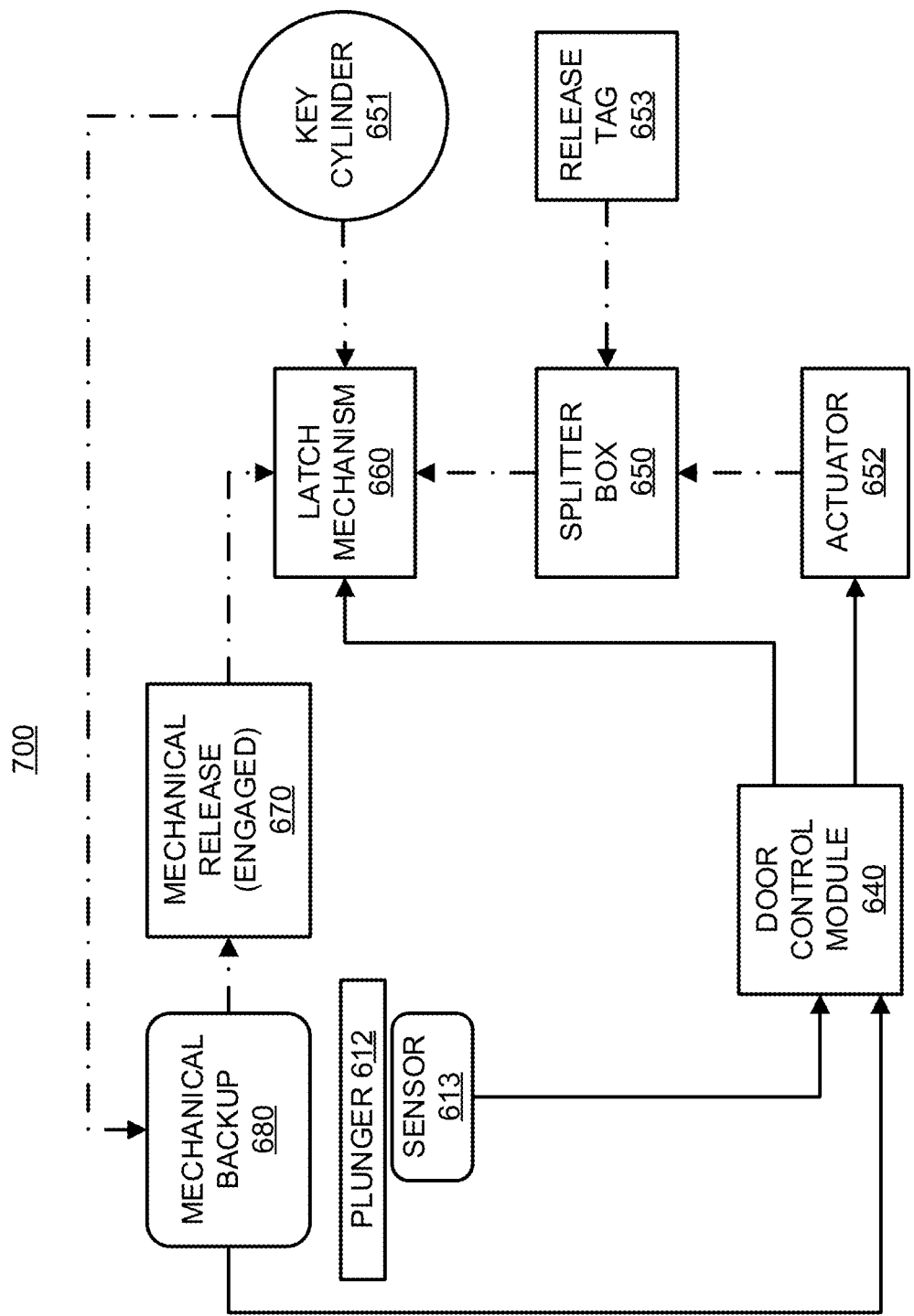
FIG. 7 shows a block diagram of the system of FIG. 6 in a second mode, in accordance with some embodiments of the present disclosure.

FIGS. 6-7 show illustrate operating modes of an illustrative system for managing door latch, in accordance with present disclosure. For example, FIG. 6 illustrates an operating mode wherein the mechanical indication is detected and a controller determines whether to unlatch the door. In a further example, FIG. 7 illustrates an operating mode with a mechanical backup engaged (e.g., wherein the mechanical backup is actuated by the mechanical indication).

FIG. 6 shows a block diagram of illustrative system 600 for managing a latching mechanism of a vehicle, in a first mode, in accordance with some embodiments of the present disclosure. System 600 includes plunger 612, sensor 613, mechanical backup 680, mechanical release 670, door control module 640, latch mechanism 660, splitter box 650, actuator 652, key cylinder 651, and release tag 653. As illustrated, plunger 612 is not actuated in FIG. 6. Further, as illustrated in FIG. 6, mechanical release 670 is not engaged. In FIGS. 6-7, dash-dot lines illustrate mechanical couplings.

Sensor 613 is configured to detect plunger 612, which provides a mechanical indication by moving (e.g., illustrated by the double-ended arrow in FIG. 6). Sensor 613 outputs a sensor signal to door control module 640 (e.g., which may be the same as control module 550 of FIG. 5 or control circuitry 450 of FIG. 4). The sensor signal may include an analog signal, a digital signal, a communications signal (e.g., or a message), any other suitable signal, or any combination thereof. For example, sensor 612 may include a Hall Effect switch configured to provide an electrical signal indicative of plunger 612 being actuated. Sensor 613 may be coupled to door control module 640 by any suitable wired or wireless connection such as, for example, a cable (e.g., a multi-conductor cable having suitable connectors), a wire (e.g., and a chassis ground connection), a wireless communication protocol using one or more antennas, any other suitable communicative coupling, or any combination thereof. For example, sensor 612, door control module 640, or both may include a transceiver, sensor interface, input/output interface, any other suiting communications interface, or any combination thereof. In an illustrate example, when a user actuates a handle of a door, the actuation may cause plunger 612 to translate, thus providing a mechanical indication to sensor 613, which provides a sensor signal to door control module 640 indicative of the handle actuation. Door control module 640 may then determine whether to cause latch mechanism 660 to release the door (e.g., a striker thereof).

Latch mechanism 660 is configured to secure and release a vehicle door (e.g., by capturing a striker). As illustrated, latch mechanism 660 is configured to receive a control signal from door control module 640 that allows latch mechanism 660 to be released. Latch mechanism 660 may also be released by key cylinder 651, release tag 653 (e.g., via splitter box 650), or by actuation of actuator 652 (e.g., via splitter box 650, under the control of door control module 640). For example, a user may actuate release tag 653 (e.g., by pulling a cable), thus releasing latch mechanism 660 (e.g., from the inside of the vehicle). In a further example, some positions of key cylinder 651 may prevent latch mechanism 660 from releasing. In a further example, some positions of key cylinder 651 may allow latch mechanism 660 to be released or may directly release latch mechanism 660. In a further example, some positions of key cylinder 651 may prevent splitter box 650 from transmitting an actuation from release tag 653, an actuation from actuator 652, or both. In a further example, in some embodiments, some positions of key cylinder 651 may prevent mechanical backup 680 from releasing latch mechanism 660 (e.g., via mechanical release 670).

Door control module 640 may take as input state information such as, for example, a key fob indication (e.g., lock, unlock, cargo door unlock/unlatch, panic), a key fob proximity (e.g., to a sensor of the vehicle), a vehicle location, a vehicle speed, a vehicle gear position, an ignition state (e.g., off, on, accessories powered), a door state (e.g., secured, released, ajar status of the door or any other door of the vehicle), any other suitable information, or any combination thereof. Based on the input state information, door control module 640 determines whether to cause latch mechanism 660 to release. If door control module 640 determines to cause latch mechanism 660 to release, door control module 640 may generate a control signal and transmit the control signal to actuator 652 to cause latch mechanism 660 to release. In some embodiments, door control module 640 directly controls latch mechanism 660, allowing latch mechanism 660 to achieve a released state (e.g., based on a keyfob or central lock).

FIG. 7 shows a block diagram of system 600 of FIG. 6 in a second mode, in accordance with some embodiments of the present disclosure. The mode of FIG. 7 may correspond to, for example, a non-powered mode, backup operation, or any other suitable operation mode wherein mechanical release 670 is engaged. For example, as illustrated, during backup operation, mechanical backup 680 may be engaged and thus the mechanical indication of plunger 612 causes a mechanical release 670 to be actuated. In some embodiments, for example, plunger 612, when actuated, may press on or otherwise apply a force to mechanical backup 680, which transmits the force to mechanical release 670, which in turn transmits the force to latch mechanism 660 (e.g., causing latch mechanism 660 to release). As illustrated in FIG. 7, door control module 640 does not generate a control signal for actuator 652 during backup operation, but rather actuates a central lock motor to directly lock or unlock latch mechanism 660, or to allow latch mechanism 660 to achieve a released state based on mechanical release 670. For example, when powered, door control module 640 may provide actuation, signal, or power to a component of latch mechanism 660 disallowing mechanical release 670 from transmitting force or otherwise actuating latch mechanism 660. When power is lost or under any other suitable circumstance, door control module 640 may cease to prevent, or otherwise allow, mechanical release 670 to transmit force to, or otherwise actuate, latch mechanism 660. In a further example, door control module 640 may include a battery backup configured to function in the event of power loss or fault, and when power is lost or under any other suitable circumstance, door control module 640 causes mechanical release 670 to engage latch mechanism 660 when actuated by mechanical backup 680. To illustrate, backup operation may occur when electrical power is lost or otherwise compromised, and operation of the vehicle door is achieved via mechanical means (e.g., by user actuation). For example, translation of plunger 612 may actuate mechanical release 670, which actuates latch mechanism 660, thus causing latch mechanism 660 to release the door.

Figure 8:
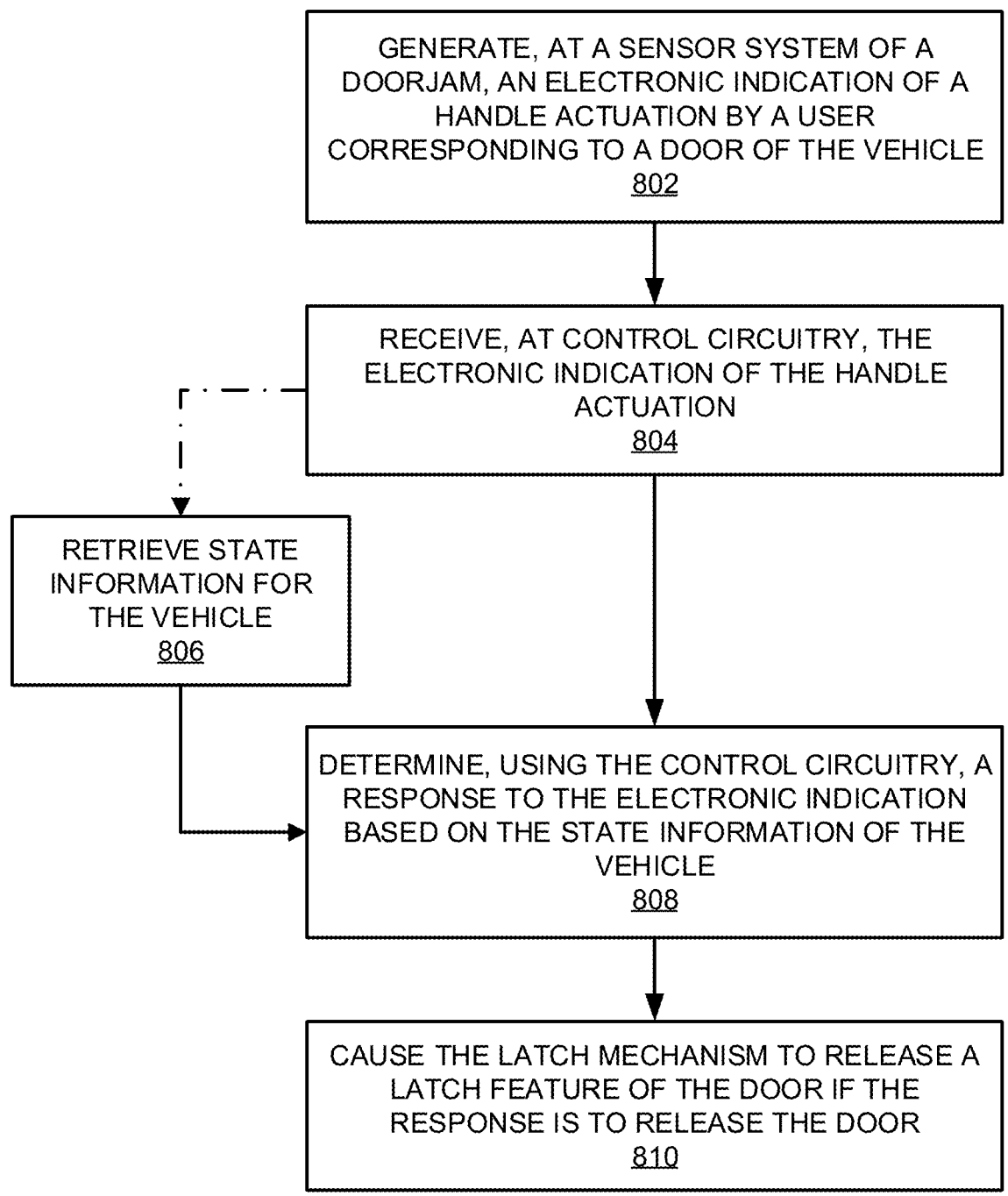
FIG. 8 is a flowchart of an illustrative process for securing and releasing a vehicle door based on a mechanical indication, in a first mode, in accordance with some embodiments of the present disclosure.

FIG. 8 is a flowchart of illustrative process 800 for securing and releasing a vehicle door based on a mechanical indication, in a first mode, in accordance with some embodiments of the present disclosure. For example, an application may perform at least some of process 800, implemented on any suitable hardware of FIGS. 1-2 and 4-7, any other suitable device, or any combination thereof. In a further example, the application may be implemented at any suitable time, and in response to any suitable trigger (e.g., which need not include a user actuation of a handle). In a further example, a system may implement process 800 (e.g., using an application).

Step 802 includes the system generating, at a sensor system of a doorjamb, an electronic indication of a handle actuation by a user corresponding to a door of a vehicle. The sensor system includes a Hall effect sensor, proximity sensor, optical sensor, any other suitable sensor, or any combination thereof. For example, the sensor system may include any of sensor(s) 410 of FIG. 4, sensor(s) 414 of FIG. 4, interior release mechanism 515 of FIG. 5 or components thereof, interior release mechanism 525 of FIG. 5 or components thereof, sensor 613 of FIGS. 6-7, any other suitable sensor or sensor system, or any combination thereof. The sensor signal may include an analog signal (e.g., proportional to a mechanical indication, position, or other property), a digital signal (e.g., using any suitable binary protocol, messaging protocol, bus protocol, or combination thereof), any other suitable signal, or any combination thereof. The door may include a door handle mechanism that generates a mechanical indication from a user actuation of a door handle. For example, the door handle mechanism need not include any wires, circuits, or sensors, and may include only mechanical components for providing the mechanical indication (e.g., movement such as translation and/or rotation of one or more components). In some embodiments, the sensor system may be coupled to control circuitry configured to receive the sensor signal.

Step 804 includes the system receiving, at control circuitry, the electronic indication of the handle actuation. The control circuitry may include, for example, a sensor interface for receiving sensor signals, conditioning or processing sensor signals (e.g., amplifying, filtering, modulating/demodulating, digitizing, latching), providing electrical power to a sensor (e.g., via current loop, DC bus, or other suitable power), or a combination thereof. In some embodiments, the control circuitry is configured to continuously receive a signal from a sensor system and accordingly respond to particular values of the signal. In some embodiments, the control circuitry is configured to sample a sensor signal at a predetermined schedule (e.g., a predetermined sample rate determined by a digital clock), in response to one or more events (e.g., a query from another system, another sensor signal, a user input, any other suitable events, or a combination thereof), or a combination thereof.

Step 806 includes the system retrieving state information for the vehicle. In some embodiments, the control circuitry includes a communications interface configured to communication with one or more other devices such as, for example, a key fob, a central controller (e.g., a vehicle controller such as control unit 480 of FIG. 4, core module 570 or dynamics module 560 of FIG. 5), a mobile device, one or more sensors (e.g., proximity sensors), a GPS system, any other suitable device, or any combination thereof. In some embodiments, the control circuitry is configured to query another device or system for state information. In some embodiments, another device or system is configured to push state information (e.g., via messages, signals, or both) that may be received by the control circuitry. For example, in some embodiments, retrieving state information may include receiving packets, messages, or signals that indicate state information. To illustrate, state information may include: a proximity between a keyfob and a proximity sensor coupled to the control circuitry (e.g., as determined using any suitable technique); a lock command from the keyfob (e.g., lock, unlock, compartment unlock); a status of the keyfob (e.g., undetectable, detected, faulted); a lock status of the doorjamb system (e.g., secured, released, ajar); a lock status from another doorjamb system configured to interact with another door system (e.g., secured, released, ajar); a lock status of a key-lock cylinder (e.g., locked, unlocked, manual); a drivetrain status of the vehicle (e.g., moving, still, gear position); a location of the vehicle (e.g., based on GPS information, proximity information, user input, communications network location and connectivity, or a combination thereof); a speed of the vehicle (e.g., zero or nonzero, less than a threshold, a numerical value, or a combination thereof); an electrical status of the vehicle; any other suitable metric, or any combination of metrics thereof. In some embodiments, the control circuitry may update state information at a predetermined schedule, in response to receiving state information, or a combination thereof. In some embodiments, the control circuitry may continuously update state information (e.g., at a predetermined frequency).

Step 808 includes the system determining, using the control circuitry, a response to the electronic indication based on the state information of the vehicle. In some embodiments, the control circuitry may apply a set of logic rules (e.g., an algorithm) to determine the response based on the state information. For example, a predetermined mapping, database, data structure, or other reference may be used to determine a response based on one or more inputs corresponding to the state information. In some embodiments, the control circuitry may apply an algorithm that may assign binary values to one or more state metrics, and accordingly determine a response based on the binary values. For example, a series of flag values (e.g., having binary values such as "0/1", "yes/no") may be used to determine the response.

Step 810 includes the system causing the latch mechanism to release a latch feature of the door if the response is to release the door. If the system determines at step 808 that the latch mechanism is to be released, the system may transmit an actuation signal to the latching mechanism. In some embodiments, the system may provide electrical power to the latch mechanism to release the latch feature of the door. To illustrate, in some embodiments, the latch mechanism includes an electromechanical element, powered by any suitable electrical power (e.g., at 12 VDC), that engages a latch feature of the door to secure the door. The control circuitry may provide a control signal to a relay to control operation of the latch mechanism such that higher current signals to power the latch are separate from the lower current control signals. If, at step 808, the control circuitry determines to do nothing or otherwise secure the door, then the system may skip step 810 (e.g., and the door remains secured until either a change of state or a subsequent handle indication wherein process 800 may be repeated).

Figure 9:
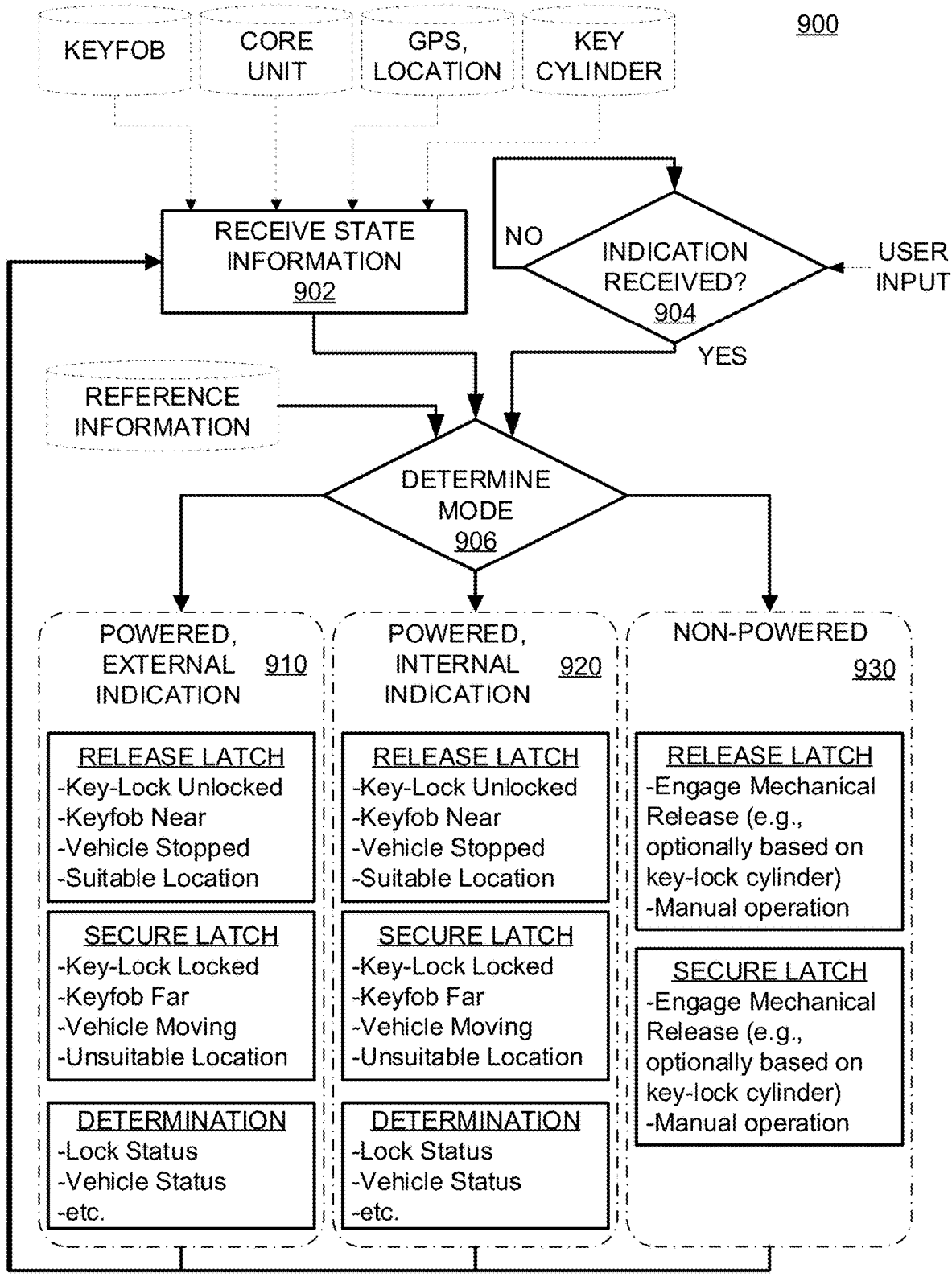
FIG. 9 is a flowchart of an illustrative process for managing a latching mechanism of a vehicle, in accordance with some embodiments of the present disclosure.

FIG. 9 is a flowchart of illustrative process 900 for managing a latching mechanism of a vehicle, in accordance with some embodiments of the present disclosure. For example, an application may perform process 900, implemented on any suitable hardware of FIGS. 1-2 and 4-7, any other suitable device, or any combination thereof. In a further example, the application may be implemented at any suitable time, and in response to any suitable trigger (e.g., which need not include a user actuation of a handle). Process 900 is described herein in the context of a system any suitable control circuitry configured to implement an application.

At step 902, the system receives state information about one or more aspects of the vehicle. The system may receive information from a keyfob, a core unit (e.g., control unit 480 of FIG. 4 or core module 570 of FIG. 5), a GPS module (e.g., which may be part of control circuitry 450 of FIG. 4, control unit 480 of FIG. 4, control module 550 of FIG. 5, dynamics module 560 of FIG. 5, core module 570 of FIG. 5, or a separate module), a key cylinder (e.g., key cylinder 651 of FIGS. 6-7), any other suitable device, or any combination thereof. State information may include, for example, a proximity between a keyfob and a proximity sensor coupled to the control circuitry (e.g., as determined using any suitable technique); a lock command from the keyfob (e.g., lock, unlock, compartment unlock); a status of the keyfob (e.g., undetectable, detected, faulted); a lock status of the doorjamb system (e.g., secured, released, ajar); a lock status from another doorjamb system configured to interact with another door system (e.g., secured, released, ajar); a lock status of a key-lock cylinder (e.g., locked, unlocked, manual); a drivetrain status of the vehicle (e.g., moving, still, gear position); a location of the vehicle (e.g., based on GPS information, proximity information, user input, communications network location and connectivity, or a combination thereof); a speed of the vehicle (e.g., zero or nonzero, less than a threshold, a numerical value, or a combination thereof); an electrical status of the vehicle; any other suitable metric or information, or any combination of metrics thereof. The system may receive state information at a predetermined schedule or frequency, as devices provide state information, in response to a handle actuation, at any other suitable time, or any combination thereof.

At step 904, the system determines whether an indication to open a door has been received. In some embodiments, the system identifies the indication based on a sensor signal received from a sensor configured to sense a mechanical indication of a handle actuation. In some embodiments, the application receives an indication from a user via a user interface (e.g., of a touchscreen, keyfob, mobile device, or any other suitable device or interface). In some embodiments, the system manages a flag or other indicator, which may be updated when an indication is received. If the system does not receive an indication to open a door at step 904, for example, the system may repeat step 904 until an indication is received.

At step 906, the system determines an operating mode under which determinations are to be made. For example, if an indication is received at step 904, the system may proceed to step 906. The system may determine the operating mode based on state information, indication information (e.g., which door handle was actuated), reference information, any other suitable information or criterion, or any combination thereof. For example, to determine a mode, the system may determine a power status (e.g., powered, non-powered, faulted), handle location (e.g., interior or exterior to the vehicle), a key-cylinder status (e.g., locked or unlocked), a door status (e.g., closed or ajar), a latch status (e.g., secured, released), any other suitable status, or any combination thereof. The system may determine an operating mode based on the state information, select from among a plurality of predetermined operating modes, or a combination thereof. As illustrated, for example, three operating modes are shown.

If at step 906 the system determines the mode to be powered and an external indication (e.g., from a door handle external to the vehicle), then the system may perform one or more of steps 910. Steps 910 include, for example, releasing a latch, securing a latch, determining a vehicle status, of a combination thereof. For example, if the system determines that a door handle actuation from an exterior handle has occurred (e.g., at step 904), the system may, at steps 910, release a latch corresponding to that door. In an illustrative example, if the vehicle is moving, the vehicle is an unsuitable location, the keyfob is not detected (e.g., too far away) or detected inside the vehicle, another door is open, the door corresponding to the handle actuation is ajar or already open/unlatched, the vehicle is in a locked state (e.g., based on the keyfob or a key-lock cylinder), or a combination thereof, then the system may determine not to release the latch at step 910 (e.g., or otherwise secure the latch at step 910). In a further illustrative example, if the vehicle is not moving (e.g., zero speed, in PARK, in NEUTRAL, parking brake engaged), the vehicle is a suitable location (e.g., on a delivery route, at one of a predetermined set of acceptable locations), the keyfob is detected (e.g., outside the vehicle and near the door), other doors are closed (e.g., all or some of the doors of the vehicle), the door corresponding to the handle actuation is closed (e.g., and latched), the vehicle is in an unlocked state (e.g., based on the keyfob or a key-lock cylinder), or a combination thereof, then the system may determine to release the latch at step 910. In some embodiments, the system may apply a similar determination for a hold-open latch, although the determinations may differ based on security concerns (e.g., the criteria to allow release of the hold-open latch may be less stringent than for releasing the latch for opening the door).

If at step 906 the system determines the mode to be powered with an internal indication (e.g., from a door handle internal to the vehicle), then the system may perform one or more of steps 920. Steps 920 include, for example, releasing a latch, securing a latch, determining a vehicle status, of a combination thereof. For example, if the system determines that a door handle actuation from an interior handle has occurred (e.g., at step 904), the system may, at steps 920, release a latch corresponding to that door. The latch may be actuated by the system based on both interior and exterior (e.g., steps 910) door handle actuations. In an illustrative example, similar to steps 910, if the vehicle is moving, the vehicle is an unsuitable location, the keyfob is not detected (e.g., not inside the vehicle or too far away), another door is open, the door corresponding to the handle actuation is ajar or already open/unlatched, the vehicle is in a locked state (e.g., based on the keyfob or a key-lock cylinder), or a combination thereof, then the system may determine not to release the latch at step 920 (e.g., or otherwise secure the latch at step 920). In some embodiments, the system may be configured to allow unlatching/latching of the door based on a handle actuation of an interior door handle more readily (e.g., subject to fewer constraints) than from an exterior door handle (e.g., for security). For example, the system may determine not to the release the latch in response to an interior door handle actuation if the vehicle is moving, the vehicle is an unsuitable location, the door corresponding to the handle actuation is ajar or already open/unlatched, or a combination thereof, then the system may determine not to release the latch at step 920 (e.g., or otherwise secure the latch at step 920). Accordingly, the system may use any suitable criteria in determining whether to release or secure the latch in response to a door handle actuation (e.g., interior or exterior to the vehicle). In a further illustrative example, if the vehicle is not moving (e.g., zero speed, in PARK, in NEUTRAL), the vehicle is a suitable location (e.g., on a delivery route, at one of a predetermined set of acceptable locations), the keyfob is detected (e.g., is near or inside the vehicle), other doors are closed (e.g., all or some of the doors of the vehicle), the door corresponding to the handle actuation is closed (e.g., and latched), the vehicle is in an unlocked state (e.g., based on the keyfob or a key-lock cylinder), or a combination thereof, then the system may determine to release the latch at step 920. In some embodiments, the system may apply a similar determination for a hold-open latch, although the determinations may differ based on security concerns (e.g., the criteria to allow release of the hold-open latch may be less stringent than for releasing the latch for opening the door). In some embodiments, the system may apply steps 910 and 920 based on the same criteria, different criteria, or the criteria may depend on status information. For example, the system may apply steps 910 and 920 based on the same criteria, unless the all doors are closed (e.g., to allow a person to exit the vehicle by an interior handle actuation), the keyfob is not detected (e.g., to allow a person to exit the vehicle by an interior handle actuation), a key-lock cylinder position, any other suitable criterion, or any combination thereof.

If at step 906 the system determines the mode to be unpowered, under-powered, faulted, or otherwise not in normal operation, then the system may perform one or more of steps 930. Additionally, or alternately, the system may be incapable of further determination or generating signals in an unpowered state, and accordingly, the lack of power may cause mechanical interlinking of the system (e.g., without action by the control circuitry). For example, in some embodiments, electrical power allows the system to prevent engaging of mechanical releases actuated by manual actuations.

In an illustrative example, steps 930 may correspond to the configuration of FIG. 7, wherein mechanical release 670 is engaged. In some embodiments, if the system has lost power (e.g., depleted battery, low voltage), not be powered (e.g., the vehicle has not been activated or placed in an "ON" configuration), undergone a fault or other event that may disrupt power, or otherwise is non-powered, the system may engage a mechanical release. For example, when powered, the system may provide actuation, signal, or power to the latch thus disallowing the mechanical release from transmitting force or otherwise actuating the latch. When power is lost or under any other suitable circumstance, the system may cease to prevent, or otherwise allow, the mechanical release to transmit force to, or otherwise actuate, the latch. In a further example, the system may include a battery backup configured to function in the event of power loss or fault, and when power is lost or under any other suitable circumstance, the system causes the mechanical release to engage, or be capable of engaging, the latch. In some embodiments, the mechanical release may allow the mechanical indication provided by the handle actuation (e.g., interior or exterior handle) to actuate the latch mechanism. For example, the mechanical release may allow the mechanical indication provided by the handle actuation to actuate the latch mechanism without activity of the control circuitry (e.g., the mechanical release is a manual bypass). A force is transmitted from the mechanical indication (e.g., translation of a plunger) to the mechanical release, which in turn transmits the force to the latch (e.g., thus causing release of the latch). In some embodiments, the mechanical release may also require that a key-lock cylinder be in a particular position (e.g., an "unlocked" or "manual" position). When the mechanical release is engaged, the mechanical indication applies a force that is transmitted to the latch mechanism (e.g., optionally gated by a key-lock cylinder) to cause the latch mechanism to release the door.

In an illustrative example of process 900, the system may include two separate release-trains, which are operated by the same exterior handle. To illustrate, the handle mechanism may be packaged in a sliding door (e.g., a pocket door) and may actuate a plunger mechanism when the door is in the closed position. The plunger mechanism protrudes from the door towards the doorjamb when the handle is pulled and triggers a Hall-effect sensor or an electrical switch packaged on the vehicle's body (e.g., in the doorjamb). The electrical switch or Hall-effect sensor may transmit an electrical signal to control circuitry of the system. The control circuitry (e.g., optionally based on the vehicle's lock status) may trigger an actuator to pull a release lever on the latch (e.g., release the latch), thus opening the door. In a further example, if the vehicle is locked, the electrical signal may be ignored (e.g., the actuator does not pull on the release lever and the door remains latched).

In a further example, in some embodiments, the system may include an actuator configured to accommodate the rigors of last-mile delivery service (e.g., 500k opening-closing cycles). For example, in some such embodiments, because an operator will be entering and exiting the vehicle's interior (e.g., an authentication zone) hundreds of times a day, it may be advantageous to not have a physical lock motor actuating inside the latch to secure the vehicle (e.g., for each handle actuation). In some embodiments, by using a switch or sensor and control circuitry to control a latch actuator, the system is able to cause actuation of the latch only when a user is actively trying to enter the vehicle (e.g., locking as fast and as frequently as the status can be updated in the control module). Thus, the latch is only actuated when the system determines the latch to be actuated, not in response to any criteria (e.g., a keyfob proximity or state, a vehicle state), which may increase the number of actuations that are not required. In a further example, should the switch or hall effect sensor, or actuator fail, the control circuitry may diagnose an electrical fault and inform the operator to engage the backup release system (e.g., the mechanical release of steps 930). In some embodiments, the backup system activates a release chain that uses the motion (e.g., translational or rotational) of the indicator (e.g., a plunger) to engage the release lever on the latch. When in a non-powered mode, backup mode, or otherwise non-controlled mode (e.g., equivalent to steps 930), the control circuitry may utilize an integrated power lock motor in the latch to provide locking behavior. For example, this redundancy may allow an operator to continue operating the door (e.g., complete a delivery route using the sliding door) should a fault occur in the primary release system (e.g., the automatic release-train controlled by control circuitry, as steps 910 and 920).

In some embodiments, the system includes a primary release chain as a "Virtual lock" system. For example, if a user has a keyfob nearby, the control circuitry may respect switch signals from the mechanical indicator and drive the latch actuator to release the door (e.g., steps 910 and 920 of FIG. 9). In some such embodiments, if the keyfob is not present or proximal, or the vehicle state is "Locked," the control circuitry may ignore (e.g., not respond to) the switch signal indicative of the handle actuation. For example, the lock state, as determined by the control circuitry, may change as quickly or as frequent as needed without wear of the latch mechanism, because it is a digital state in the microprocessor logic of the control circuitry. To illustrate, a driver may leave and enter a keyfob authentication zone hundreds of times a day, and without the control circuitry controlling actuation of the latch mechanism, the latch motor would likely fail very early in the vehicle's life (e.g., it would be actuating to secure and release more frequently).

In some embodiments, in the event of a system failure, however, the control circuitry might not be able to secure and release the latch mechanism using the actuator (e.g., the vehicle may require repairs). Thus, when the backup chain is engaged, the latch actuator may cycle every time the driver enters or leaves the authentication zone and the door may be used until the vehicle is repaired.

The foregoing is merely illustrative of the principles of this disclosure, and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A system for managing door operation of a vehicle, the system comprising:
   a door comprising:
      a door handle configured for mechanical actuation,
      an indicator coupled to the door handle and actuated by motion of the door handle, wherein the indicator is configured to move between a first position when the door handle is not actuated to a second position when the door handle is actuated, and
      a latch feature configured to be engaged for latching the door closed;
   a doorjamb configured for the door to close against, the doorjamb comprising:
      a proximity sensor configured to generate a sensor signal indicative of a position of the indicator, and
      a latching mechanism configured to secure and release the latch feature of the door; and
   control circuitry coupled to the sensor and the latching mechanism, the control circuitry configured to:
      receive the sensor signal from the proximity sensor, and
      control the latching mechanism based on the sensor signal.

2. The system of claim 1, wherein the door handle and the indicator are not actuated by electrically powered components.

3. The system of claim 1, wherein the indicator comprises a plunger coupled to the door handle, wherein the proximity sensor comprises a button configured to be pressed by the plunger when in the second position, and wherein when the button is pressed the sensor signal is indicative of the plunger being in the second position.

4. The system of claim 1, wherein the control circuitry is further configured to:
   determine a position of the indicator based on the sensor signal;
   receive state information of the vehicle; and
   cause the latching mechanism to release the latch feature further based on the position and based on the state information.

5. The system of claim 1, wherein the door handle is an exterior door handle arranged on an exterior side of the door.

6. The system of claim 5, wherein the door handle is a first door handle, wherein the indicator is a first indicator wherein the sensor is a first sensor configured to generate a first sensor signal, wherein the door further comprises:
   a second door handle arranged on an interior side of the door;
   a second indicator coupled to the second door handle and actuated by motion of the second door handle and wherein the doorjamb further comprises:
   a second sensor configured to generate a second sensor signal indicative of a state of the second indicator.

7. The system of claim 6, wherein the control circuitry is further configured to:
   determine the position of the first indicator based on the first sensor signal;
   determine a position of the second indicator based on the second sensor signal;
   receive state information of the vehicle; and
   cause the latching mechanism to release the latch feature based on the state information and based on at least one of the position of the first indicator or the second indicator.

8. The system of claim 1, wherein the doorjamb further comprises a mechanical release configured to release the latching mechanism based on the motion of the door handle by transmitting force from the door handle to the latching mechanism.

9. A system for managing door operation of a vehicle, the system comprising:
   a door comprising a door handle coupled to an indicator configured to move between a first position and a second position during a handle actuation of the door handle;
   a doorjamb system configured to generate a sensor signal indicative of the first position and the second position, the doorjamb system comprising a latch system arranged in the doorjamb and comprising a latch configured to secure and release the door from the doorjamb system; and
   control circuitry coupled to the doorjamb system, the control circuitry configured to:
      cause the door handle to be mechanically decoupled from the latch system, wherein when mechanically coupled, the door handle transmits a force from the handle actuation to the latch system to cause the latch to release the door, and
      cause the latch to secure or release the door based at least in part on the sensor signal when the door handle is mechanically decoupled from the latch system.

10. The system of claim 9, wherein:
   a first operating mode corresponds to the door handle mechanically decoupled from the latch system such that the control circuitry causes the latch to release the door in response to the sensor signal when the indicator is in the second position; and a second operating mode corresponds to the door handle mechanically coupled to the latch system such that the force causes the latch to release the door independent of the control circuitry.

11. The system of claim 9, wherein the control circuitry is further configured to cause the latch to secure or release the door based on at least one of:
   a proximity between a keyfob and a proximity sensor coupled to the control circuitry;
   a lock command from the keyfob;
   a status of the keyfob;
   a lock status of the doorjamb system;
   a lock status from another doorjamb system configured to interact with another door system;
   a lock status of a key-lock cylinder;
   a drivetrain status of the vehicle;
   a location of the vehicle;
   a speed of the vehicle; or
   an electrical status of the vehicle.

12. A method for managing door operation of a vehicle, the method comprising:
   generating, at a sensor system of a doorjamb of a door, an electronic indication of a position of an indicator, wherein a door handle system comprises the indicator and a door handle mechanically coupled to the indicator, wherein the indicator moves between a first position and a second position when the door handle is actuated, and wherein the door handle system does not contain electrical components;
   in response to receiving, at control circuitry, the electronic indication from the sensor system corresponding to the second position:
      retrieving state information for the vehicle;
      determining, using the control circuitry, a response to the electronic indication based on the state information of the vehicle; and
      using the control circuitry to cause a latch mechanism to release a latch feature of the door when the response is to release the door; and
   in response to an electric status of the vehicle being disrupted, mechanically coupling the door handle to the latch mechanism such that when the door handle is actuated, the door handle mechanically causes the latch mechanism to release the latch feature.

13. The method of claim 12, further comprising:
   determining the response based on keyfob information when the door handle is an exterior door handle; or
   determining the response is to release the door when the door handle is an interior door handle.

14. The method of claim 12, wherein the state information comprises at least one of:
   a proximity between a keyfob and a proximity sensor coupled to the control circuitry;
   a lock command from the keyfob;
   a status of the keyfob;
   a lock status of the door;
   a lock status of another door;
   an ajar status of the door;
   a lock status of a key-lock cylinder;
   a drivetrain status of the vehicle;
   a location of the vehicle;
   a speed of the vehicle; or
   an electrical status of the vehicle.

15. The method of claim 12, wherein:
   the door handle comprises an exterior handle of the door handle system;
   the state information comprises a proximity of a keyfob to a proximity sensor of the vehicle, a lock status of a key cylinder, and an electrical status of the vehicle; and
   the response to the electronic indication is to cause the latch mechanism to release the latch feature when the proximity is less than a threshold, the lock status of the key cylinder is unlocked, and the electrical status of the vehicle is active.

16. The method of claim 12, wherein:
   the door handle comprises an exterior handle of the door handle system;
   the state information comprises a proximity of a keyfob to a proximity sensor of the vehicle, and a lock status of a key cylinder; and
   the response to the electronic indication is to secure or not release the latch mechanism when the proximity is greater than a threshold or the lock status of the key cylinder is locked.

17. The method of claim 12, wherein:
   the door handle comprises an interior handle of the door handle system;
   the state information comprises a lock status of a key cylinder, and an electrical status of the vehicle; and
   the response to the electronic indication is to cause the latch mechanism to release the latch feature when the lock status of the key cylinder is unlocked, and the electrical status of the vehicle is active.

18. The method of claim 12, further comprising:
   identifying the electronic indication as being indicative of the handle being actuated.

19. The method of claim 12, wherein the state information comprises:
   respective ajar statuses for a plurality of doors of the vehicle comprising the door; and
   lock statuses for the plurality of doors, the method further comprising:
      determining whether one or more doors of the plurality of doors is ajar or unlocked; and
      preventing the latch mechanism from releasing the latch feature of the door when the one or more doors of the plurality of doors is ajar or unlocked.

* * * * *